US012699288B2

(12) United States Patent
Yezek et al.

(10) Patent No.: US 12,699,288 B2
(45) Date of Patent: Aug. 4, 2026

(54) ELECTROPHORETIC MEDIA COMPRISING ELECTROPHORETIC PARTICLES AND A COMBINATION OF CHARGE CONTROL AGENTS

(71) Applicant: E INK CORPORATION, Billerica, MA (US)

(72) Inventors: Lee Yezek, Watertown, MA (US); Stephen J. Telfer, Arlington, MA (US); Sherry Hsin-Yi Tsai, Chelmsford, MA (US); Ziyan Wu, Wayland, MA (US); Eugene Bzowej, Dunstable, MA (US); Ali Sarvi, San Jose, CA (US); Craig Gibeau, Billerica, MA (US)

(73) Assignee: E Ink Corporation, Billerica, MA (US)

( * ) Notice: Subject to any disclaimer, the term of this patent is extended or adjusted under 35 U.S.C. 154(b) by 737 days.

(21) Appl. No.: 18/089,826

(22) Filed: Dec. 28, 2022

(65) Prior Publication Data

US 2023/0213790 A1 Jul. 6, 2023

Related U.S. Application Data

(60) Provisional application No. 63/296,179, filed on Jan. 4, 2022.

(51) Int. Cl.
*G02F 1/00* (2006.01)
*G02F 1/167* (2019.01)
*G02F 1/1676* (2019.01)
*G02F 1/1681* (2019.01)

(52) U.S. Cl.
CPC ............ *G02F 1/0018* (2013.01); *G02F 1/167* (2013.01); *G02F 1/1676* (2019.01); *G02F 1/1681* (2019.01)

(58) Field of Classification Search
CPC ...... G02F 1/0018; G02F 1/167; G02F 1/1676; G02F 1/1681; G02F 2001/1678
See application file for complete search history.

(56) References Cited

U.S. PATENT DOCUMENTS

| | | | |
|---|---|---|---|
| 4,418,346 A | 11/1983 | Batchelder | |
| 5,852,196 A | 12/1998 | Hou | |
| 5,872,552 A | 2/1999 | Gordon, II et al. | |
| 5,930,026 A | 7/1999 | Jacobson et al. | |
| 6,017,584 A | 1/2000 | Albert et al. | |
| 6,130,774 A | 10/2000 | Albert et al. | |
| 6,144,361 A | 11/2000 | Gordon, II | |
| 6,184,856 B1 | 2/2001 | Gordon, II | |
| 6,225,971 B1 | 5/2001 | Gordon, II | |
| 6,241,921 B1 | 6/2001 | Jacobson et al. | |
| 6,271,823 B1 | 8/2001 | Gordon, II | |
| 6,445,489 B1 | 9/2002 | Jacobson et al. | |
| 6,504,524 B1 | 1/2003 | Gates et al. | |
| 6,512,354 B2 | 1/2003 | Jacobson et al. | |
| 6,531,997 B1 | 3/2003 | Gates et al. | |
| 6,545,797 B2 | 4/2003 | Chen et al. | |
| 6,664,944 B1 | 12/2003 | Albert et al. | |
| 6,672,921 B1 | 1/2004 | Liang et al. | |
| 6,693,620 B1 | 2/2004 | Herb et al. | |
| 6,753,999 B2 | 6/2004 | Zehner et al. | |
| 6,787,600 B1 * | 9/2004 | Thetford | C09D 11/03 525/63 |
| 6,788,449 B2 | 9/2004 | Liang et al. | |
| 6,788,452 B2 | 9/2004 | Liang et al. | |
| 6,825,970 B2 | 11/2004 | Goenaga et al. | |
| 6,866,760 B2 | 3/2005 | Paolini, Jr. et al. | |
| 6,900,851 B2 | 5/2005 | Morrison et al. | |
| 6,922,276 B2 | 7/2005 | Zhang et al. | |
| 6,930,818 B1 | 8/2005 | Liang et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,023,420 B2 | 4/2006 | Comiskey et al. | |
| 7,034,783 B2 | 4/2006 | Gates et al. | |
| 7,038,656 B2 | 5/2006 | Liang et al. | |
| 7,038,670 B2 | 5/2006 | Liang et al. | |
| 7,046,228 B2 | 5/2006 | Liang et al. | |
| 7,052,571 B2 | 5/2006 | Wang et al. | |
| 7,061,166 B2 | 6/2006 | Kuniyasu | |
| 7,061,662 B2 | 6/2006 | Chung et al. | |
| 7,072,095 B2 | 7/2006 | Liang et al. | |
| 7,075,502 B1 | 7/2006 | Drzaic et al. | |

(Continued)

FOREIGN PATENT DOCUMENTS

JP 2009244635 A 10/2009

OTHER PUBLICATIONS

Kitamura, T. et al., “Electrical toner movement for electronic paper-like display”, Asia Display/IDW ’01, pp. 1517-1520, Paper HCS1-1 (2001).
Yamaguchi, Y. et al., “Toner display using insulative particles charged triboelectrically”, Asia Display/IDW ’01, pp. 1729-1730, Paper AMD4-4 (2001).
Hertel, Dirk, “Optical measurement standards for reflective e-paper to predict colors displayed in ambient illumination environments,” Color Res Appl, pp. 1-15 (2018).
European Patent Office, “International Search Report and Written Opinion”, PCT/US2022/054136, May 2, 2023. May 2, 2023.

*Primary Examiner* — Kumar R Bhushan
(74) *Attorney, Agent, or Firm* — Ioannis Constantinides

(57) ABSTRACT

An electrophoretic medium is disclosed comprising four types of particles. The first type of particles has a first charge polarity. The second and third types of particles have a second charge polarity that is opposite to the first charge polarity. The electrophoretic medium further comprises, a first charge control agent, and a second charge control agent, the molecular structure of the first charge control agent including a quaternary ammonium group and a non-polar tail and the molecular structure of the second charge control agent including two or more polar groups, and a non-polar tail.

11 Claims, 13 Drawing Sheets

(56) References Cited

U.S. PATENT DOCUMENTS 7,116,318 B2 10/2006 Amundson et al.
7,116,466 B2 10/2006 Whitesides et al.
7,119,772 B2 10/2006 Amundson et al.
7,144,942 B2 12/2006 Zang et al.
7,167,155 B1 1/2007 Albert et al.
7,170,670 B2 1/2007 Webber
7,176,880 B2 2/2007 Amundson et al.
7,177,066 B2 2/2007 Chung et al.
7,193,625 B2 3/2007 Danner et al.
7,202,847 B2 4/2007 Gates
7,236,291 B2 6/2007 Kaga et al.
7,259,744 B2 8/2007 Arango et al.
7,312,784 B2 12/2007 Baucom et al.
7,321,459 B2 1/2008 Masuda et al.
7,327,511 B2 2/2008 Whitesides et al.
7,339,715 B2 3/2008 Webber et al.
7,385,751 B2 6/2008 Chen et al.
7,408,699 B2 8/2008 Wang et al.
7,411,719 B2 8/2008 Paolini, Jr. et al.
7,453,445 B2 11/2008 Amundson
7,492,339 B2 2/2009 Amundson
7,492,505 B2 2/2009 Liang et al.
7,528,822 B2 5/2009 Amundson et al.
7,535,624 B2 5/2009 Amundson et al.
7,583,251 B2 9/2009 Arango et al.
7,602,374 B2 10/2009 Zehner et al.
7,612,760 B2 11/2009 Kawai
7,679,599 B2 3/2010 Kawai
7,679,814 B2 3/2010 Paolini, Jr. et al.
7,683,606 B2 3/2010 Kang et al.
7,715,088 B2 5/2010 Liang et al.
7,787,169 B2 8/2010 Abramson et al.
7,800,813 B2 9/2010 Wu et al.
7,839,564 B2 11/2010 Whitesides et al.
7,859,742 B1 12/2010 Chiu et al.
7,910,175 B2 3/2011 Webber
7,952,557 B2 5/2011 Amundson
7,952,790 B2 5/2011 Honeyman et al.
7,982,479 B2 7/2011 Wang et al.
7,982,941 B2 7/2011 Lin et al.
7,999,787 B2 8/2011 Amundson et al.
8,009,348 B2 8/2011 Zehner et al.
8,040,594 B2 10/2011 Paolini, Jr. et al.
8,054,526 B2 11/2011 Bouchard
8,077,141 B2 12/2011 Duthaler et al.
8,098,418 B2 1/2012 Paolini, Jr. et al.
8,125,501 B2 2/2012 Amundson et al.
8,139,050 B2 3/2012 Jacobson et al.
8,159,636 B2 4/2012 Sun et al.
8,174,490 B2 5/2012 Whitesides et al.
8,243,013 B1 8/2012 Sprague et al.
8,274,472 B1 9/2012 Wang et al.
8,289,250 B2 10/2012 Zehner et al.
8,300,006 B2 10/2012 Zhou et al.
8,314,784 B2 11/2012 Ohkami et al.
8,363,299 B2 1/2013 Paolini, Jr. et al.
8,373,649 B2 2/2013 Low et al.
8,384,658 B2 2/2013 Albert et al.
8,422,116 B2 4/2013 Sprague et al.
8,456,414 B2 6/2013 Lin et al.
8,462,102 B2 6/2013 Wong et al.
8,503,063 B2 8/2013 Sprague
8,514,168 B2 8/2013 Chung et al.
8,537,105 B2 9/2013 Chiu et al.
8,558,783 B2 10/2013 Wilcox et al.
8,558,786 B2 10/2013 Lin
8,558,855 B2 10/2013 Sprague et al.
8,576,164 B2 11/2013 Sprague et al.
8,576,259 B2 11/2013 Lin et al.
8,576,470 B2 11/2013 Paolini, Jr. et al.
8,576,475 B2 11/2013 Huang et al.
8,576,476 B2 11/2013 Telfer et al.
8,605,032 B2 12/2013 Liu et al.
8,605,354 B2 12/2013 Zhang et al.
8,649,084 B2 2/2014 Wang et al.
8,665,206 B2 3/2014 Lin et al.
8,670,174 B2 3/2014 Sprague et al.
8,681,191 B2 3/2014 Yang et al.
8,704,756 B2 4/2014 Lin
8,717,664 B2 5/2014 Wang et al.
8,786,935 B2 7/2014 Sprague
8,797,634 B2 8/2014 Paolini, Jr. et al.
8,810,525 B2 8/2014 Sprague
8,873,129 B2 10/2014 Paolini, Jr. et al.
8,902,153 B2 12/2014 Bouchard et al.
8,902,491 B2 12/2014 Wang et al.
8,917,439 B2 12/2014 Wang et al.
8,928,562 B2 1/2015 Gates et al.
8,928,641 B2 1/2015 Chiu et al.
8,964,282 B2 2/2015 Wang et al.
8,976,444 B2 3/2015 Zhang et al.
9,013,394 B2 4/2015 Lin
9,013,783 B2 4/2015 Sprague
9,019,197 B2 4/2015 Lin
9,019,198 B2 4/2015 Lin et al.
9,019,318 B2 4/2015 Sprague et al.
9,082,352 B2 7/2015 Cheng et al.
9,116,412 B2 8/2015 Lin
9,146,439 B2 9/2015 Zhang
9,170,468 B2 10/2015 Lin et al.
9,182,646 B2 11/2015 Paolini, Jr. et al.
9,195,111 B2 11/2015 Anseth et al.
9,199,441 B2 12/2015 Danner
9,218,773 B2 12/2015 Sun et al.
9,224,338 B2 12/2015 Chan et al.
9,224,342 B2 12/2015 Sprague et al.
9,224,344 B2 12/2015 Chung et al.
9,230,492 B2 1/2016 Harrington et al.
9,262,973 B2 2/2016 Wu et al.
9,279,906 B2 3/2016 Kang
9,285,649 B2 3/2016 Du et al.
9,299,294 B2 3/2016 Lin et al.
9,360,733 B2 6/2016 Wang et al.
9,361,836 B1 6/2016 Telfer et al.
9,383,623 B2 7/2016 Lin et al.
9,390,066 B2 7/2016 Smith et al.
9,390,661 B2 7/2016 Chiu et al.
9,423,666 B2 8/2016 Wang et al.
9,459,510 B2 10/2016 Lin
9,460,666 B2 10/2016 Sprague et al.
9,495,918 B2 11/2016 Harrington et al.
9,501,981 B2 11/2016 Lin et al.
9,513,527 B2 12/2016 Chan et al.
9,513,743 B2 12/2016 Sjodin et al.
9,514,667 B2 12/2016 Lin
9,541,814 B2 1/2017 Lin et al.
9,612,502 B2 4/2017 Danner et al.
9,620,048 B2 4/2017 Sim et al.
9,671,668 B2 6/2017 Chan et al.
9,672,766 B2 6/2017 Sjodin
9,691,333 B2 6/2017 Cheng et al.
9,697,778 B2 7/2017 Telfer et al.
9,721,495 B2 8/2017 Harrington et al.
9,759,978 B2 9/2017 Liu
9,759,980 B2 9/2017 Du et al.
9,792,861 B2 10/2017 Chang et al.
9,792,862 B2 10/2017 Hung et al.
9,812,073 B2 11/2017 Lin et al.
9,921,451 B2 3/2018 Telfer et al.
10,162,242 B2 12/2018 Wang et al.
10,209,556 B2 2/2019 Rosenfeld et al.
10,214,647 B2 2/2019 Yezek et al.
10,229,641 B2 3/2019 Yang et al.
10,276,109 B2 4/2019 Crounse et al.
10,319,313 B2 6/2019 Harris et al.
10,339,876 B2 7/2019 Lin et al.
10,353,266 B2 7/2019 Bouchard et al.
10,444,553 B2 10/2019 Laxton
10,467,984 B2 11/2019 Buckley et al.
10,593,272 B2 3/2020 Telfer et al.
10,657,869 B2 5/2020 Telfer et al.
10,672,350 B2 6/2020 Amundson et al.
10,782,586 B2 9/2020 Liu et al.
11,098,206 B2 8/2021 Wu et al.

(56) References Cited

U.S. PATENT DOCUMENTS

| | | | |
|---|---|---|---|
| 11,151,951 B2 | 10/2021 | Lin et al. | |
| 2003/0102858 A1 | 6/2003 | Jacobson et al. | |
| 2004/0246562 A1 | 12/2004 | Chung et al. | |
| 2005/0253777 A1 | 11/2005 | Zehner et al. | |
| 2007/0103427 A1 | 5/2007 | Zhou et al. | |
| 2007/0176912 A1 | 8/2007 | Beames et al. | |
| 2007/0286975 A1* | 12/2007 | Fazel | C08G 18/4825 428/40.1 |
| 2008/0024429 A1 | 1/2008 | Zehner | |
| 2008/0024482 A1 | 1/2008 | Gates et al. | |
| 2008/0043318 A1 | 2/2008 | Whitesides et al. | |
| 2008/0136774 A1 | 6/2008 | Harris et al. | |
| 2008/0303780 A1 | 12/2008 | Sprague et al. | |
| 2009/0225398 A1 | 9/2009 | Duthaler et al. | |
| 2010/0156780 A1 | 6/2010 | Jacobson et al. | |
| 2010/0194733 A1 | 8/2010 | Lin et al. | |
| 2010/0194789 A1 | 8/2010 | Lin et al. | |
| 2010/0265561 A1 | 10/2010 | Gates et al. | |
| 2011/0043543 A1 | 2/2011 | Chen et al. | |
| 2011/0063314 A1 | 3/2011 | Chiu et al. | |
| 2011/0175875 A1 | 7/2011 | Lin et al. | |
| 2011/0221740 A1 | 9/2011 | Yang et al. | |
| 2012/0001957 A1 | 1/2012 | Liu et al. | |
| 2012/0098740 A1 | 4/2012 | Chiu et al. | |
| 2013/0063333 A1 | 3/2013 | Arango et al. | |
| 2013/0249782 A1 | 9/2013 | Wu et al. | |
| 2014/0055840 A1 | 2/2014 | Zang et al. | |
| 2014/0078576 A1 | 3/2014 | Sprague | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2014/0362213 A1 | 12/2014 | Tseng | |
| 2015/0005720 A1 | 1/2015 | Zang et al. | |
| 2015/0262255 A1 | 9/2015 | Khajehnouri et al. | |
| 2015/0268531 A1 | 9/2015 | Wang et al. | |
| 2015/0301246 A1 | 10/2015 | Zang et al. | |
| 2016/0012710 A1 | 1/2016 | Lu et al. | |
| 2016/0180777 A1 | 6/2016 | Lin et al. | |
| 2018/0031994 A1* | 2/2018 | Rosenthal | C09D 11/037 |
| 2020/0242993 A1* | 7/2020 | Telfer | G02F 1/167 |
| 2020/0348576 A1 | 11/2020 | Visani et al. | |
| 2020/0355978 A1 | 11/2020 | Bzowej et al. | |
| 2021/0247658 A1 | 8/2021 | Anseth et al. | |
| 2022/0082896 A1 | 3/2022 | Telfer et al. | |
| 2022/0244612 A1 | 8/2022 | Sarvi et al. | |
| 2022/0251364 A1 | 8/2022 | Sarvi et al. | |

* cited by examiner

| White | White | White | White | White | White | White | White |
|-------|-------|-------|-------|-------|-------|-------|-------|
| Yellow | Magenta Yellow | Magenta | Cyan Magenta | Cyan | Yellow Cyan | Cyan Magenta Yellow | |

Cyan Magenta Yellow columns above with headers:

Cyan
Magenta Cyan
Yellow Yellow Magenta Magenta Cyan Cyan Yellow

| | | | | | | | |
|--|--|--|--|--|--|--|--|
| Cyan Magenta Yellow | Cyan Magenta | Cyan | Cyan Yellow | Yellow | Magenta Yellow | Magenta | |

| White | Yellow | Red | Magenta | Blue | Cyan | Green | Black |
|-------|--------|-----|---------|------|------|-------|-------|
| [A] | [B] | [C] | [D] | [E] | [F] | [G] | [H] |

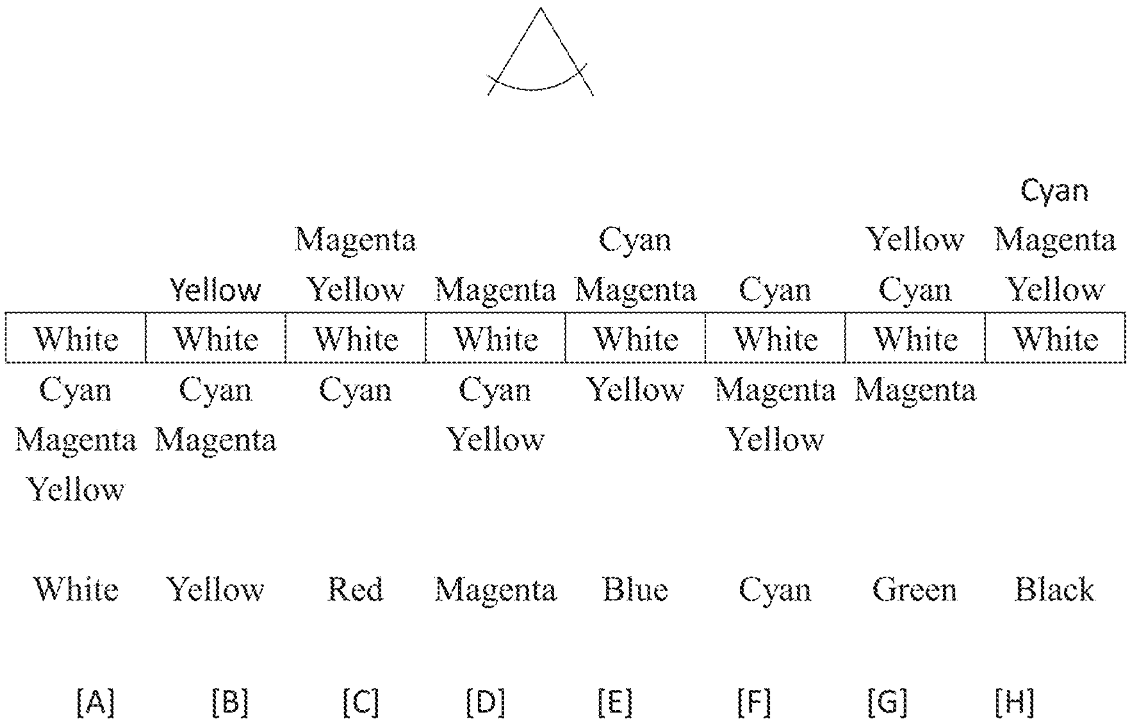

FIG. 1

Viewing Side

Mixed Positive [Black]     Low Positive [Yellow]

+ L, - H

Key

◯ = -*

⬤ (checkered) = +

⬤ (black) = ++*

◯ (dotted) = +++

Viewing Side

Mixed Positive [Black]

Retained Positive + Low Positive [Red]

+ H, - H

Key

○ = -*

▨ = +

● = ++*

◍ = +++

Time (s)

| Display A | ⊟ | No Solsperse 8000, 8V |
| Display B | ◇ | Solsperse 8000 (140 mg/g) |
| Display C | △ | Solsperse 8000 (280 mg/g) |

ELECTROPHORETIC MEDIA COMPRISING ELECTROPHORETIC PARTICLES AND A COMBINATION OF CHARGE CONTROL AGENTS

RELATED APPLICATIONS

This application claims priority to U.S. Provisional Patent Application No. 63/296,179 filed on Jan. 4, 2022, which is incorporated by reference in its entirety, along with all other patents and patent applications disclosed herein.

BACKGROUND

An electrophoretic display changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. As used herein, the term "color" includes black and white. The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode layer at the viewing surface, a second electrode layer (also referred to as back electrode or bottom electrode), and an electrophoretic medium including oppositely charged white and black particles. When a voltage of one polarity is applied across the electrophoretic medium, the white particles move to the viewing surface, and when a voltage of the opposite polarity is provided the black particles move to the viewing surface. If the second electrode layer (back electrode) includes controllable regions (pixels), either segmented electrodes or an active matrix of pixel electrodes controlled by transistors, a pattern can be made to appear electronically at the viewing surface. The pattern can be, for example, the text to a book.

More recently, a variety of color option have become commercially available for electrophoretic displays, including three-color displays (black, white, red and black white, yellow), and four color displays (black, white, red, yellow). Similar to the operation of black and white electrophoretic displays, electrophoretic displays with three or four reflective particles operate similarly to the simple black and white displays, because the desired color particle is driven to the viewing surface. The driving schemes are far more complicated than only black and white, but in the end, the optical function of the particles is the same.

Advanced Color electronic Paper (ACeP™) also included four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is important to control carefully the position of each of the (50 to 500 nanometer-sized) pigments within a working space of about 10 to 20 micrometers in thickness. Obviously, variations in the position of the particles will result in incorrect colors being displayed at a given pixel. Accordingly, exquisite voltage control is required for such a system. More details of this system are available in the following U.S. patents, all of which are incorporated by reference in their entireties: U.S. Pat. Nos. 9,361,836, 9,921,451, 10,276,109, 10,353,266, 10,467,984, and 10,593,272.

The term gray state is used herein in its conventional meaning in the imaging art to refer to a state intermediate two extreme optical states of a pixel, and does not necessarily imply a black-white transition between these two extreme states. For example, several of the E Ink patents and published applications, which are mentioned below, describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms "bistable" and "bistability" are used herein in their conventional meaning in the art to refer to displays comprising display elements having first and second display states differing in at least one optical property, and such that, after any given element has been driven by means of an addressing pulse of finite duration, to assume either its first or second display state. After the addressing pulse has terminated, that state will persist for at least several times, for example, at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in abroad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles, sometimes referred to as pigment particles, move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid, and a capsule wall surrounding the internal phase. Typically, the capsules are themselves held within a polymeric binder to form a coherent layer positioned between two electrode layers. The technologies described in these patents and applications include:

(a) Electrophoretic particles, fluids and fluid additives; see for example U.S. Pat. Nos. 7,002,728, 7,679,814, 10,214,647, and 11,098,206, and U.S. Patent Application Publication No. 2020/0355978;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502*; 7,167,155; 7,385,751; 7,492,505; 7,667,684; 7,684,108; 7,791,789; 7,800,813; 7,821,702; 7,839,564*; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S.

Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and patent applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of a fluid and a continuous phase of a polymeric material, and that the discrete droplets of electrophoretic medium within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating, meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques. Thus, the resulting display can be flexible. Further, because the display medium can be printed (using a variety of methods), the display itself can be made inexpensively.

As indicated above, most simple prior art electrophoretic media essentially display only two colors. Such electrophoretic media either use a single type of electrophoretic particle having a first color in a colored fluid having a second, different color, or first and second types of electrophoretic particles having differing first and second colors in an uncolored fluid. In the first case, the first color is displayed when the particles lie adjacent the viewing surface of the display and the second color is displayed when the particles are spaced from the viewing surface. In the second case, the first color is displayed when the first type of particles lie adjacent the viewing surface of the display and the second color is displayed when the second type of particles lie adjacent the viewing surface. Typically, the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three sub-pixels, in the case of RGB displays, or the four sub-pixels, in the case of RGBW displays, are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black, switching the corresponding primary colors on or off. For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multicolor electrophoretic displays having a single back plane comprising independently addressable pixel electrodes and a common, light-transmissive first electrode layer (also referred to as front electrode or top electrode). Between the back plane and the first light-transmissive electrode layer is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Other types of electrophoretic display systems provide a single electrophoretic medium capable of rendering a color at any pixel location. Specifically, U.S. Pat. No. 9,697,778 describes a display in which a dyed solvent is combined with a white (light-scattering) particle that moves in a first direction when addressed with a low applied voltage and in the opposite direction when addressed with a higher voltage. When the white particles and the dyed solvent are combined with two additional particles of opposite charge to the white particle, it is possible to render a full-color display. However, the color states of the '778 patent are not acceptable for applications such as a text reader. In particular, there will always be some of the dyed fluid separating the white scattering particle from the viewing surface, which leads to a tint in the white state of the display.

An electrophoretic medium capable of rendering a variety of colors at any pixel location is described in U.S. Pat. No. 10,475,399. In this case, the electrophoretic medium comprises white pigment particles having a first charge polarity, two types of colored pigment particles having a second charge polarity opposite to the first charge polarity, and a dye that is soluble to the fluid, providing a color to the electrophoretic medium.

Yet another form of electrophoretic medium capable of rendering any color at any pixel location is described in U.S. Pat. Nos. 9,921,451 and 10,678,111. The electrophoretic medium disclosed in these patents, which we can call "Type I" electrophoretic medium for convenience, includes four types of particles: white, cyan, magenta and yellow, in which two of the types of particles are positively-charged and two types of particles are negatively charged. However, the corresponding displays suffer from color mixing with the white state. Because one type of particles has the same charge as the white particle, some quantity of the same-charge particle moves with the white particles toward the viewing surface when the white state is desired. That is, it is difficult to separate the white pigment from one type of the colored pigment particles having the same charge polarity as the white pigment particles. While it is possible to overcome this unwanted tinting with complex waveforms, such waveforms greatly increase the update time of the display and in some instances, result in unacceptable "flashing" between images. For example, the switching between the white optical state and the black optical state may be slow with Type I electrophoretic media. On the other hand, it was observed that the color gamut that can be achieved by Type I electrophoretic medium is wide.

Another form of electrophoretic medium capable of rendering any color at any pixel location is described in U.S. Patent Application No. 2022/0082896 (Ser. No. 17/474,582). The electrophoretic medium in this form of electrophoretic medium, which we can call "Type II" electrophoretic medium for convenience, includes four types of particles: white, cyan, magenta and yellow. The white particles are negatively charged, and the cyan, magenta, and yellow particles are positively charged. Equivalently, the white particles may be positively charged, and the cyan, magenta, and yellow particles may be negatively charged. Having three colored pigments of the opposite polarity of the white pigment in Type II media, enables uncontaminated white state. Furthermore, it was observed that electrophoretic displays having Type II electrophoretic media solve the problem of slow switching between different optical states, such as the switching between the white optical state and the black optical state. On the other hand, the inventors of the present invention have found that it is difficult to separate three types of colored particles of the same charge polarity into the necessary combinations to render various colors. Thus, it was observed that the color gamut achieved by Type II electrophoretic media is narrower than that of Type I electrophoretic media.

The above indicates that there is a need to develop an electrophoretic medium that is able to achieve good color gamut and fast switching between different optical states of the corresponding electrophoretic display. The inventors of the present invention surprisingly found that electrophoretic media comprising four types of particles (Type I or Type II), and further comprising a combination of a first charge control agent and a second charge control agent enables the construction of the corresponding displays having both wide color gamut and fast switching. The molecular structure of the first charge control agent includes a quaternary ammonium group and a non-polar tail. The molecular structure of the second charge control agent includes two or more polar groups, and a non-polar tail.

SUMMARY

In an aspect, the present invention discloses an improved electrophoretic medium for color electrophoretic displays. The electrophoretic medium comprises a non-polar fluid, four type of particles, a first type of particles, a second type of particles, a third type of particles, and a fourth type of particles, a first charge control agent, and a second type of charge control agent. The first type of particles comprises a first type of pigment, the first type of pigment being inorganic and having a first color, the first type of particles having a first charge polarity. The second type of particles comprises a second type of pigment, the second type of pigment having a second color, the second color being different from the first and second colors, the second type of particles having a second charge polarity, the second charge polarity being opposite to the first charge polarity. The third type of particles comprises a third type of pigment having a third color, the third color being different from the first and second colors, the third type of particles having the second charge polarity. The fourth type of particles comprises a fourth type of pigment having a fourth color, the fourth color being different from the first, second, and third colors, the fourth type of particles having the first charge polarity or the second charge polarity. The second, third, and fourth types of pigments may be light-absorbing, organic pigments. The fourth type of particles may comprise pigment particles and a polymer, the polymer having a content of less than 35 weight percent by weight of the particle. The first color may be white, the second color may be cyan, the third color may be magenta, and the fourth color may be yellow. The yellow, magenta and cyan pigments may exhibit diffuse reflectances at 650, 550 and 450 nm, respectively, when the respective particles are approximately isotropically distributed at 15% by volume (volume particles to volume of fluid) in a non-polar fluid having a refractive index less than 1.55.

The electrophoretic medium of the present invention may be used in a color electrophoretic display. The color electrophoretic display may comprise a first light-transmissive electrode layer at a viewing surface, a second electrode layer, and an electro-optic material layer. The second electrode layer includes an array of thin film transistors coupled to pixel electrodes. The electro-optic material layer, comprising the electrophoretic medium of the invention is disposed between the first light-transmissive electrode layer and the second electrode layer.

The first charge control agent has a molecular structure. The molecular structure of the first charge control agent includes at least one quaternary ammonium group and a non-polar tail. The second charge control agent has a molecular structure. The molecular structure of the second charge control agent includes two or more polar groups, and a non-polar tail. The two or more polar groups are selected from the group consisting of amino group, sulfonate group, sulfate group, sulfinate group, carboxylic acid group, phosphonic acid group, phosphinate group, phosphate group, hydroxyl group, thiol group, alpha diketone group, beta diketone group, ethylene oxide group, and propylene oxide group. The polar groups of the second charge control agent may be primary or secondary amino groups. The polar group may also be a tertiary amino group, but not a quaternary ammonium. The nitrogen of the amino group may be part of a heterocycle ring that is aromatic or non-aromatic. The molecular structure of the first charge control agent (and of the second charge control agent) may include at least one amide group. The amide group may be part of non-polar tail.

The non-polar tail comprises a polymeric group. The polymeric group is formed by a monomer comprising an alkyl or an alkenyl group having at least ten carbon atoms.

The molecular structure of the monomer that is used to form the polymeric group of the non-polar tail of the second charge control agent (but also the non-polar tail of the first charge control agent) may include a carboxylic acid, a carboxylic acid anhydride, or a carboxylic acid halide. The carboxyl acid and the carboxylic acid halide may comprise from 10 to 22 carbon atoms. The carboxylic acid anhydride may comprise from 20 to 44 carbon atoms. The molecular structure of the monomer that forms the polymeric tail of the second charge control agent may further comprise a hydroxyl group or an amine group. The monomer that is used to form the polymeric tail of the second charge control agent (and the first charge control agent) may be selected from the group consisting of ricinoleic acid, linoleic acid, oleic acid, linoleic acid, acid halide of ricinoleic acid, acid halide of linoleic acid, acid halide of linolenic acid, ricinoleic acid anhydride, linoleic acid anhydride, oleic acid anhydride, and linolenic acid anhydride.

The molecular structure of the second charge control agent may include a comb polymer having alkyl or alkenyl branches and two terminal polar functional groups.

The molecular structure of the second charge control agent may comprise two or more polar functional groups, none of which are quaternary ammonium groups. That is the molecular structure of the second charge control agent may comprise one or more quaternary ammonium functional groups. Alternatively, the molecular structure of the second charge control agent may comprise two or more polar groups one or more of which may be a quaternary ammonium functional groups.

The electrophoretic medium may further comprise a water-soluble ether. The water-soluble ether has molecular weight of from 75 to 5,000 Dalton. The water-soluble ether may be represented by Formula I, Formula II, or Formula III, wherein n is 1 to 145; R1 is hydrogen, methyl or ethyl group; R2, R3, R4, R5, R6, and R7 are selected independently from the group consisting of hydrogen, linear or branched alkyl group comprising from 1 carbon atom to 6 carbon atoms, phenyl, and benzyl group. Each of Formula I, II, and III comprises at least one ether functional group. For Formula I, n may also be 1 to 10.

Formula I

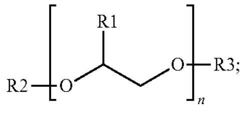

Formula II

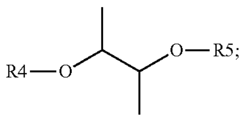

-continued

Formula III

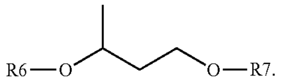

The first, second, third, and fourth types of particles may have a layer of polymer. The polymer may be complexed, adsorbed, or covalently bonded to the first, second, third, and fourth types of pigments. The first type of particles may be light-scattering particles. The first type of particles may comprise inorganic pigment particles, such as titanium dioxide, that are treated with a silane and a monomer or a combination of monomers. The monomer may be an alkyl methyl methacrylate, such as lauryl methacrylate, or an alkyl acrylate, such as lauryl acrylate. The combination of monomers may include 2,2,2-trifluoroethyl methacrylate. The first type of particles may comprise inorganic pigment particles, such as titanium dioxide, that are treated with a monomer, such as alkyl methyl methacrylate, and 2,2,2-trifluoroethyl methacrylate. The second type of particles may comprise second type of pigment particles, such as phthalocyanine blue (Pigment Blue 15:3) and a polymer formed by methyl methacrylate and a monomer comprising dimethylsiloxane, such as monomethyl methacrylate poly(dimethylsiloxane). The third type of particles may comprise third type of pigment particles and a polymer formed by methyl methacrylate and a monomer comprising dimethylsiloxane, such as monomethyl methacrylate poly(dimethylsiloxane). The fourth type of particles may comprise fourth type of pigment particles and a polymer formed by methyl methacrylate and a monomer comprising dimethylsiloxane, such as monomethyl methacrylate poly(dimethylsiloxane). The third type of particles may comprise third type pigment particles, such as Pigment Red 122, which are treated with vinylbenzyl chloride and a monomer, such as methyl methacrylate. The fourth type of particles may comprise fourth type of particles, such as Pigment Yellow 155 that are treated with methyl methacrylate and a monomer comprising dimethylsiloxane, such as monomethyl methacrylate poly(dimethylsiloxane).

The polarities of the second and third types of particles may have second polarity, such as positive, and the first and fourth type of particles may have first polarity, such as negative. The second, third, and fourth types of particles may all have a second polarity that is opposite to the first polarity. That is, the first type of particles may have positive polarity and the second, third, and fourth type of particles may have negative polarity.

Alternatively, the first type of particles may have negative polarity and the second, third, and fourth type of particles may have positive polarity. The second type of particles has a second zeta potential, the third type of particles has a third zeta potential, and the fourth type of particles has a fourth zeta potential. The second, third, and fourth zeta potentials may all be positive. The second zeta potential may be larger than the third fourth zeta potential and the fourth zeta potential may be smaller than the third zeta potential.

In another aspect, the present invention provides a color electrophoretic display comprising (a) a first light-transmissive electrode layer, (b) a microcell layer comprising a plurality of microcells, (c) a sealing layer, and (d) a second electrode layer. Each microcell of the plurality of microcells has an opening. The sealing layer spans the opening of each microcell of the plurality of microcells. Each microcell of the plurality of microcells includes an electrophoretic medium. The electrophoretic medium comprises a non-polar fluid, four type of particles, a first type of particles, a second type of particles, a third type of particles, a fourth type of particles, and a first type of charge control agent. The first type of particles comprises a first type of pigment, the first type of pigment being inorganic and having a first color, the first type of particles having a first charge polarity. The second type of particles comprises a second type of pigment, the second type of pigment having a second color, the second color being different from the first and second colors, the second type of particles having a second charge polarity, the second charge polarity being opposite to the first charge polarity. The third type of particles comprises a third type of pigment having a third color, the third color being different from the first and second colors, the third type of particles having the second charge polarity. The fourth type of particles comprises a fourth type of pigment having a fourth color, the fourth color being different from the first, second, and third colors, the fourth type of particles having the first charge polarity or the second charge polarity. The fourth type of particles may comprise a pigment particle and a polymer. The polymer may have a content of less than 35 weight percent by weight of the particle. The first color may be white, the second color may be cyan, the third color may be magenta, and the fourth color may be yellow.

The first charge control agent has a molecular structure, the molecular structure of the first charge control agent including a quaternary ammonium group and a non-polar tail.

The color electrophoretic display also comprises a water-soluble ether. The water-soluble ether has molecular weight of from 75 to 5,000 Dalton. The water-soluble ether is present in the sealing layer or in the electrophoretic layer of the color electrophoretic display. The water-soluble ether may be present in the sealing layer and in the electrophoretic layer of the color electrophoretic display. The water-soluble ether may be represented by Formula I, Formula II, or Formula III, wherein n is 1 to 145; R1 is hydrogen, methyl or ethyl group; R2, R3, R4, R5, R6, and R7 are selected independently from the group consisting of hydrogen, linear or branched alkyl group comprising from 1 carbon atom to 6 carbon atoms, phenyl, and benzyl group. Each of Formula I, II, and III comprises at least one ether functional group. For Formula I, n may also be 1 to 10. The water-soluble ether may be selected from the group consisting of ethylene glycol monomethyl ether, ethylene glycol monoethyl ether, ethylene glycol mono-n-propyl ether, ethylene glycol monoisopropyl ether, ethylene glycol n-monobutyl ether, ethylene glycol monoisobutyl ether, ethylene glycol mono-t-butyl ether, ethylene glycol monobenzyl ether, ethylene glycol monophenyl ether, ethylene glycol dimethyl ether, ethylene glycol diethyl ether, ethylene glycol di-n-propyl ether, ethylene glycol diisopropyl ether, diethylene glycol monomethyl ether, diethylene glycol monoethyl ether, diethylene glycol mono-n-propyl ether, diethylene glycol monoisopropyl ether, diethylene glycol n-monobutyl ether, diethylene glycol monoisobutyl ether, diethylene glycol mono-t-butyl ether, diethylene glycol monobenzyl ether, diethylene glycol monophenyl ether, diethylene glycol dimethyl ether, diethylene glycol diethyl ether, diethylene glycol ethyl methyl ether, diethylene glycol di-n-propyl ether, diethylene glycol diisopropyl ether, diethylene glycol di-n-butyl, triethylene glycol monomethyl ether, triethylene glycol monoethyl ether, triethylene glycol mono-n-propyl ether, triethylene glycol monoisopropyl ether, triethylene glycol n-monobutyl ether, triethylene glycol monoisobutyl ether, triethylene glycol mono-t-butyl ether, triethylene glycol monobenzyl ether, triethylene glycol monophenyl ether, triethylene glycol dimethyl ether, triethylene glycol diethyl ether, triethylene glycol di-n-propyl ether, triethylene glycol diisopropyl ether, tetraethylene glycol monomethyl ether, tetraethylene glycol monoethyl ether, triethylene glycol monophenyl ether, tetraethylene glycol dimethyl ether, polyethylene glycol monomethyl ether, polyethylene glycol monoethyl ether, polyethylene glycol monophenyl ether, propylene glycol monomethyl ether, propylene glycol monoethyl ether, propylene glycol mono-n-propyl ether, propylene glycol monoisopropyl ether, propylene glycol mono-n-butyl ether, propylene glycol monoisobutyl ether, propylene glycol monophenyl ether, propylene glycol dimethyl ether, propylene glycol diethyl ether, dipropylene glycol monomethyl ether, dipropylene glycol monoethyl ether, dipropylene glycol mono-n-propyl ether, dipropylene glycol monoisopropyl ether, dipropylene glycol mono-n-butyl ether, dipropylene glycol monoisobutyl ether, dipropylene glycol dimethyl ether, dipropylene glycol diethyl ether, dipropylene glycol di-n-propyl ether, dipropylene glycol diisopropyl ether, tripropylene glycol monomethyl ether, tripropylene glycol monoethyl ether, tripropylene glycol mono-n-propyl ether, tripropylene glycol monoisopropyl ether, tripropylene glycol mono-n-butyl ether, and tripropylene glycol monoisobutyl ether.

The electrophoretic medium may further comprise a second charge control agent having a molecular structure. The molecular structure of the second charge control agent may include two or more polar groups, and a non-polar tail. The two or more polar groups may be selected from the group consisting of amino group, sulfonate group, sulfate group, sulfinate group, carboxylic acid group, phosphonic acid group, phosphinate group, phosphate group, hydroxyl group, thiol group, alpha diketone group, beta diketone group, ethylene oxide group, and propylene oxide group. The non-polar tail comprises a polymeric group. The polymeric group may be formed by a monomer comprising an alkyl or alkenyl group having at least ten carbon atoms. The molecular structure of the monomer that is used to form the polymeric group of the non-polar tail of the second charge control agent may include a carboxylic acid, a carboxylic acid anhydride, or a carboxylic acid halide. The carboxyl acid and the carboxylic acid halide may comprise from 10 to 22 carbon atoms. The carboxylic acid anhydride may comprise from 20 to 44 carbon atoms. The molecular structure of the monomer that forms the polymeric tail of the second charge control agent may further comprise a hydroxyl group or an amine group. The monomer that is used to form the polymeric tail of the second charge control agent may be selected from the group consisting of ricinoleic acid, linoleic acid, oleic acid, linoleic acid, acid halide of ricinoleic acid, acid halide of linoleic acid, acid halide of linolenic acid, ricinoleic acid anhydride, linoleic acid anhydride, oleic acid anhydride, and linolenic acid anhydride. The molecular structure of the second charge control agent may include a comb polymer having alkyl or alkenyl branches and two terminal polar functional groups.

The molecular structure of the second charge control agent may comprise two or more polar functional groups, none of which are quaternary ammonium groups. That is the molecular structure of the second charge control agent may comprise one or more quaternary ammonium functional groups. Alternatively, the molecular structure of the second charge control agent may comprise two or more polar groups one or more of which may be a quaternary ammonium functional groups.

BRIEF DESCRIPTION OF DRAWINGS

FIG. 1 is a schematic cross-section showing the positions of the various types of particles in an electrophoretic medium of the present invention when displaying black, white, the three subtractive primary and the three additive primary colors.

DETAILED DESCRIPTION

Figure 2:
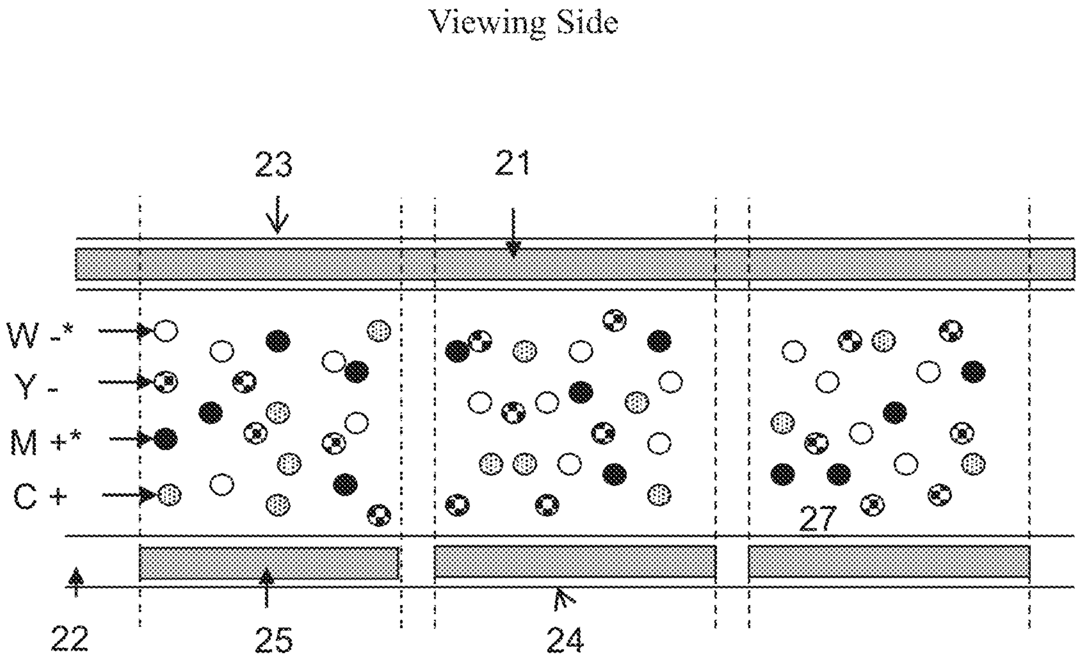
FIG. 2 is a general illustration of an electrophoretic display having a Type I electrophoretic medium with four types of particles in a non-polar fluid.

The term "polyamine", as used herein, is an organic compound that has a molecular structure including two or more amino groups. The amino groups may be primary, secondary or tertiary amino group.

The term "carboxylic acid derivative" is compound that has a molecular structure including a carboxylic acid halide or a carboxylic acid anhydride.

The term "condensation polymerization" is form of polymerization in which monomers and/or oligomers react with each other to form larger structures while releasing smaller molecules as byproducts, such as water, hydrochloric acid, methanol, and other.

As used herein, "molecular weight" refers to weight average molecular weight, unless otherwise stated. Molecular weight is measured using industry standard size exclusion column chromatography.

The term "amine", "amino group", and "amino functional group" includes primary, secondary, and tertiary amines and primary, secondary, and tertiary amine functional groups. The terms do not include "quaternary amines" and "quaternary amine functional groups".

The terms "quaternary amine" or "quaternary ammonium" or "quaternary ammonium salt" or "quaternary amine functional group" include functional groups, where the nitrogen atom has four substituents, none of which is hydrogen. That is, there is no hydrogen atoms directly connected to the nitrogen atom of the quaternary amine. The term "cationic charge control agent" means that the charge control agent includes a "quaternary amine".

The terms "pigment" and "pigment particles" are synonymous in this application.

The invention includes improved four-particle electrophoretic media, including four types of particles, a first type, a second type, a third type, and the fourth type of particles in a non-polar fluid. The first type of particles comprises a first type of pigment having a first color, the first type of pigment being inorganic. The first type of particles has a first charge polarity. The second type of particles comprises a second type of pigment having a second color that is different from the first color. The second type of particle has a second charge polarity, the second charge polarity being opposite from the first charge polarity. The third type of particles comprises a third type of pigment having a third color that is different from the first and second colors. The third type of particles has a second charge polarity. The fourth type of particles comprises a fourth type of pigment having a fourth color that is different from the first, second and third colors. The fourth type of particles has a first or second charge polarity.

Charge Control Agents

Charge control agents (CCA) are used in electrophoretic media of electrophoretic displays to control the charge on the electrophoretic particles. Typically, the CCA is a surfactant-like molecule having an ionic or other polar group, hereinafter referred to as head groups, and a non-polar chain (typically a hydrocarbon chain) that is hereinafter referred to as the tail. The CCAs may be complexed with the charged particles or absorbed into the particles. That is, the electrophoretic particles and the CCA may exist in a charge complex, or be loosely associated via van der Waals forces. It is thought that the CCA forms reverse micelles in the electrophoretic medium and that it is a small population of charged reverse micelles that leads to electrical conductivity in the medium. Reverse micelles comprise a polar core that may vary in size from 1 nm to tens of nanometers, and may have spherical, cylindrical, or other geometry, surrounded by the non-polar tail groups of the CCA molecule. In electrophoretic media, three phases may typically be distinguished: a solid particle having a surface, a highly polar phase that is distributed in the form of extremely small droplets (reverse micelles), and a continuous phase that comprises the non-polar fluid. Both the electrophoretic particles and the charged reverse micelles may move through the fluid upon application of an electric field, and thus there are two parallel pathways for electrical conduction through the fluid (which typically has a vanishingly small electrical conductivity itself).

The polar core of the reverse micelle is thought to affect the charge on surfaces by adsorption onto the surfaces. In an electrophoretic display, such adsorption may be onto the surfaces of the electrophoretic particles or the interior walls of a microcapsule (or other solid phase, such as the walls of a microcell) to form structures similar to reverse micelles, these structures hereinafter being referred to as hemi-micelles. When an ion of an ion pair is attached more strongly to the surface than the other ion, ion exchange between hemi-micelles and unbound reverse micelles can lead to charge separation in which the more strongly bound ion remains associated with the particle and the less strongly bound ion becomes incorporated into the core of a free reverse micelle.

It is also possible that the ionic material of the head group of the CCA induces ion-pair formation at the particle (or other) surface. Thus, the CCA may perform two basic functions: charge-generation at the surface and charge-separation from the surface. The charge-generation may be a result of an acid-base or an ion-exchange reaction between some moiety that is present in the CCA molecule (or otherwise incorporated into the reverse micelle core or fluid), and the particle surface. Thus, useful CCA materials are those that are capable of participating in such an interaction, or any other charging interaction as known in the art.

The mechanism of controlling particles in the electrophoretic medium is not fully understood. Uncontrolled processes can lead to undesirably high conductivity of the electrophoretic medium. In addition, in cases where the charge control agent is only physically adsorbed onto the particles, changes in conditions may cause partial or complete desorption of the charge control agent from the particles, with consequent undesirable changes in the electrophoretic characteristics of the particles. The desorbed charge control agent might resorb onto other surfaces within the electrophoretic medium, and such resorption has the potential for causing additional problems. The effect of charge control agents is especially difficult to predict in electrophoretic media comprising multiple types of electrophoretic particles, where a charge control agent may adsorb onto the surface of the different types of particles. In the case of an encapsulated electrophoretic medium, it is also possible for the charge control agent to adsorb on to the capsule wall.

The charge control agents may have an average molecular weight of greater than 500 grams/mole, or greater than 1,000 grams/mole, or greater than 1,500 grams/mole, or greater than 3,000, or greater than 5,000, or greater than 10,000. For example, the average molecular weight of the charge control agent may be between 500 grams/mole and 12,000, between 1,000 and 10,000, between 2,000 and 8,000 grams/mole, between 600 grams/mole and 2,000 grams/mole, or between 2,000 and 11,000 grams/mole.

The electrophoretic medium of the present invention comprises a combination of a first and a second charge control agents. The first and second charge control agent are soluble in the non-polar fluid of the electrophoretic medium.

The molecular structure of the first charge control agent includes a quaternary ammonium group and a non-polar tail.

The non-polar tail of the first charge control agent may comprise a polymeric group that is formed by a monomer comprising at least ten carbon atoms. The non-polar tail of the first charge control agent may comprise a polymeric group that is formed by a monomer, the molecular structure of the monomer comprising at least ten carbon atoms.

The molecular structure of the monomer that is used to form the non-polar tail of the first charge control agent may include a carboxylic acid, a carboxylic acid anhydride, or a carboxylic acid halide, wherein the carboxyl acid and the carboxylic acid halide comprises from 10 to 22 carbon atoms, and wherein the carboxylic acid anhydride comprises from 20 to 44 carbon atoms.

The molecular structure of the monomer that forms non-polar tail of the first charge control agent may comprise at least one carbon-carbon double bond. The molecular structure of the monomer that is used to form the polymeric tail of the first charge control agent may further comprise a hydroxyl group. The monomer that is used to form the polymeric tail of the first charge control agent may be selected from the group consisting of 8-hydroxystearic acid, ricinoleic acid, linoleic acid, oleic acid, linoleic acid, acid halide of 8-hydroxystearic acid, acid halide of ricinoleic acid, acid halide of linoleic acid, acid halide of linolenic acid, 8-hydroxystearic acid anhydride, ricinoleic acid anhydride, linoleic acid anhydride, oleic acid anhydride, and linolenic acid anhydride.

The molecular structure of the first charge control agent may include one or more quaternary ammonium groups. The molecular structure of the first charge control agent may include 1-12 quaternary ammonium groups. A quaternary ammonium group may be represented by the structure $[NR_1R_2R_3R_4]^+$; examples of $R_1$, $R_2$, $R_3$, and $R_4$ may include alkyl groups and aryl groups. The molecular structure of the first charge control agent includes a non-polar tail and at least one quaternary ammonium group. Useful reagents for the preparation of the first charge control agent are the class of fatty acid quaternary ammonium compounds offered by Akzo Nobel under the tradenames ARQUAD™.

Non-limiting examples of charge control agents that meet the structural criteria of the first charge control agents include commercial polymeric material such as Solsperse™ 17000, Solsperse™ 16000, and Solsperse™ 19000, supplied by Lubrizol Corporation. Solsperse™ 17000 is the reaction product of 12-hydroxy-octadecanoic acid homopolymer with N,N-dimethyl-1,3-propanediamine and methylbisulfate. Solsperse™ 16000, and Solsperse™ 19000 have a carbon-carbon bond in their non-polar tail. It has been observed that, when unsaturated quaternary ammonium charge control agents are included in electrophoretic media, the media has improved switching speeds at low temperatures. The non-polar tail of the quaternary ammonium charge control agents may be formed from a polymeric or oligomeric compound, such as a polyester. In some instances, the polyester may be formed via a condensation reaction of carboxylic acid, e.g., a fatty acid, having a secondary amine. In such instances, the condensation reaction will result in repeating units having at least one carbon-carbon double bond (i.e., unsaturated), with repeating pendant carbon chains, which may be saturated or unsaturated. The overall length of the monomer from which the tail is formed is at least 10 carbon atoms in length, for example 14 carbon atoms in length, for example 18 carbon atoms in length.

Other compounds that meet the structural criteria of the first charge control agent have been disclosed in U.S. Patent Application Publication No. 2020/0355978, which is incorporate by reference herein in its entirety. Non-limiting examples of first charge control agents are provided in structures of Formulas IV to X below, where R1 is polyricinoleic acid and R2 is polyisobutylene. These compounds may be prepared by the reaction between a molecule comprising a primary amino group (or a hydroxyl group) and a tertiary amine with a monomer (such as ricinoleic acid or isobutylene), followed by the reaction of the formed polymer with dimethyl sulfate to quaternize the tertiary amine. The amine reagent may be selected from, for example, 3-(dimethylamino)-1-propylamine, 3-dimethylamino-1-propanol, 1,4-bis(3-aminopropyl)piperazine, and tris(3-aminopropyl)amine.

Formula IV

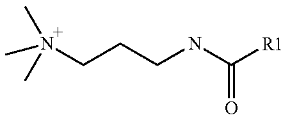

Formula V

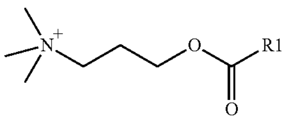

Formula VI

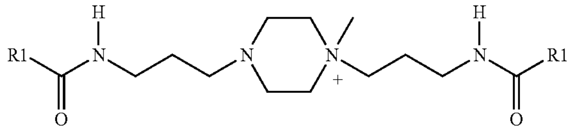

Formula VII

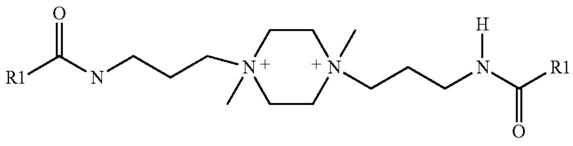

Formula VIII

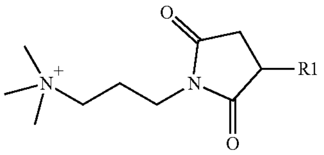

Formula IX

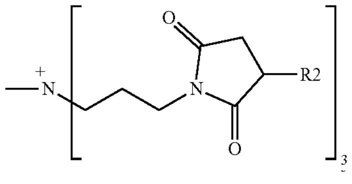

Formula X

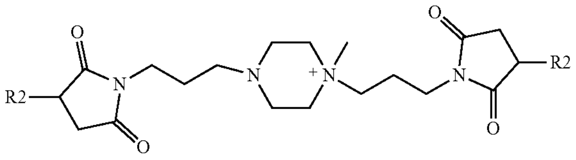

The first charge control agents may be added to the electrophoretic medium at a concentration of greater than 0.2 g of charge control agent for every 100 g of electrophoretic particles, or greater than 0.5 g of charge control agent for every 100 g of electrophoretic particles, or greater than 1.0 g of charge control agent for every 100 g of electrophoretic particles. The first charge control agents may be added into the electrophoretic medium at a concentration of greater than 1 g of charge control agent for every 100 g of electrophoretic particles. For example, the first charge control agent to electrophoretic particle ratio may be 1:30 (wt/wt), e.g., 1:25 (wt/wt), e.g., 1:20 (wt/wt).

The molecular structure of the second charge control agent includes two or more polar groups and a non-polar tail. The polar groups are selected from the group consisting of amino group, carboxylic acid group, phosphonic acid group, hydroxyl group, thiol group, alpha diketone group, beta diketone group, ethylene oxide group, and propylene oxide group. The amino group may be primary, secondary or tertiary. The nitrogen atom of the amino group may be part of a heterocycle ring that is aromatic or non-aromatic. Non-limiting examples of such heterocycle rings are acridine, benzimidazole, pyrazole, imidazole, piperazine, pyrazine, pyrimidine, pyrrole, quinazoline, triazine, azaindole, pyridine, bipyridine, indole, piperidine, pyridazine, pyrrolidine, quinoxaline, triazole, azetidine, carbazole, imidazole, imidazolines, indoline, isoindoline, piperidone, pyrazoline, pyrazolidine, aziridine, isoquinoline, purine, pyrazolo[1,5,α]pyrimidine, quinazoline, and their derivatives. The alpha diketone group may be part of ring, such as squaric acid and derivatives, or croconic acid and derivatives.

The non-polar tail of the second charge control agent may comprise a polymeric group having one or more saturated alkyl functional groups. The non-polar tail of the second charge control agent may comprises a polymeric group having at least one carbon-carbon double bond. The polymeric group may be formed by a monomer comprising at least ten carbon atoms. The molecular structure of the monomer may include a carboxylic acid, a carboxylic acid anhydride, or a carboxylic acid halide, wherein the carboxyl acid and the carboxylic acid halide comprises from 10 to 22 carbon atoms and a carbon-carbon double bond, and wherein the carboxylic acid anhydride comprises from 20 to 44 carbon atoms and two carbon-carbon double bonds. The molecular structure of the monomer may also include a hydroxyl group. Non-limiting examples of monomers that are used to form the polymeric tail of the second charge control agent may be selected from the group consisting of ricinoleic acid, linoleic acid, oleic acid, linoleic acid, acid halide of ricinoleic acid, acid halide of linoleic acid, acid halide of linolenic acid, ricinoleic acid anhydride, linoleic acid anhydride, oleic acid anhydride, and linolenic acid anhydride. The second charge control agent may be a brush-like polymer having a long non-polar (hydrophobic) chain attached via a linking group to two or more polar groups (head groups). The head groups of the second charge control agent may independently interact with and adsorb to the surface of electrophoretic particles. The presence of multiple head groups may lead in strong adsorption of the second charge control agent on a type of electrophoretic particles. As a result, the first charge control agent, which has affinity to the particle surface comprising the second charge control agent, can strongly adsorb onto the particle, modifying the zeta potential of the particle. Surface modification of particles (pigment and other particles) is common in many industries. In many case, this is achieved by modifying the synthetic route of the particle, forming customized particles. This methodology can be costly and the synthesized product can only be used for a specific system. On the contrary, the methodology of the use of a combination of two charge control agents to adjust the zeta potential of a particle can be performed directly in the composition of the application itself. Specifically, one or more charge control agents may be directly added before or during the milling of the particle dispersion that is used to prepare the electrophoretic medium. In other words, a commercial pigment product can be used without the need to pre-synthesize a customized pigment. Furthermore, by adjusting the nature and weight ratio of the corresponding charge control agents, the zeta potential of the particle can be adjusted at a desired level. Thus, the same pigment can be used for various electrophoretic media, the particle having a different zeta potential in each of the media. It must be noted here that when the term adsorption of a polymeric (or other material) on a particle in a liquid carrier is used for polymers that are soluble in the carrier, it is perceived that there is a dynamic equilibrium of the polymer between the particle surface and the soluble polymer in the carrier. Stronger adsorption of a polymer on the particle means that the amount of the polymer on the particle in relation to the total amount of the polymer present increases, A non-limiting example of a commercial polymeric material that can be used as a second charge control agent is Solsperser™ 8000 supplied by Lubrizol Corporation.

The second charge control agent may be formed by the condensation reaction of a hydroxy carboxylic acid (or a hydroxy carboxylic acid derivative) in the presence of a polyamine. The polymerization reaction is a condensation polymerization between the reagents. The condensation reaction forms (a) ester bonds between the hydroxyl group of the hydroxy carboxylic acid (or the hydroxy carboxylic acid derivative) and the carboxyl group (or the carboxylic acid halide or the carboxylic acid anhydride) of another molecule of the hydroxy carboxylic acid (or the hydroxy carboxylic acid derivative), and (b) amide bonds between an amine group of the polyamine and the carboxyl group (or the carboxylic acid halide or the carboxylic acid anhydride) of the hydroxy carboxylic acid (or the hydroxy carboxylic acid derivative).

The second charge control agents may be added to the electrophoretic medium at a concentration of greater than 0.2 g of charge control agent for every 100 g of electrophoretic particles, or greater than 0.5 g of charge control agent for every 100 g of electrophoretic particles, or greater than 1.0 g of charge control agent for every 100 g of electrophoretic particles. For example, the first charge control agent to electrophoretic particle ratio may be 1:30 (wt/wt), e.g., 1:25 (wt/wt), e.g., 1:20 (wt/wt).

The weight ratio of second charge control agent to the first charge control agent may be from about 1:10 to about 10:1, or from about 1:9 to about 10:9, or from 1:8 to about 8:1, or from about 1:6 to about 6:1, or from about 1:5 to about 5:1, or from about 1:3 to about 3:1, or from about 1:2 to about 2:1, or from about 1:1:5 to 1.5:1.

Electrophoretic Particles

In one embodiment, the electrophoretic medium of the present invention comprises four types of particles, first, second, third, and fourth types of particles, wherein the first and fourth types of particles have a first charge polarity, and the second and third types of particles have a second polarity, the second polarity being opposite to the first polarity. This represents a Type I electrophoretic medium. Typically, such a system includes a negatively charged white type of particles, a negatively charged yellow type of particles, a positively-charged cyan type of particles, and a positively-charged magenta type of particles. The yellow, cyan, and magenta represent subtractive primary colors.

In another embodiment, the electrophoretic medium of the present invention comprises four types of particles, first, second, third, and fourth types of particles, wherein the first type of particles has a first charge polarity, and the second, third, and fourth type of particles have a second polarity, the second polarity being opposite to the first polarity. This represents a Type II electrophoretic medium. Typically, such a system includes a negative white type of particles and yellow, magenta, and cyan positively-charged types of particles having subtractive primary colors.

Additionally, one or more types of particles (in both Type I and Type II electrophoretic media) may be engineered so that their electrophoretic mobility is non-linear with respect to the strength of the applied electric field. Accordingly, one or more types of particles will experience a decrease in electrophoretic mobility with the application of a high electric field (e.g., 20 V or greater) of the correct polarity. Various optical states of such a four-particle systems (Type I and Type II) is shown schematically in FIG. 1. The corresponding display can provide white, yellow, red, magenta, blue, cyan, green, and black color states at every pixel.

As shown in FIG. 1, each of the eight principal colors (red, green, blue, cyan magenta, yellow, black and white) corresponds to a different arrangement of the four types of particles, such that the viewer only sees those colored particles that are on the viewing side of the white type of particles (i.e., the only type of particles that scatters light). To achieve a wide range of colors, additional voltage levels must be used for finer control of the types of particles. In the formulations described, the first type of particles is reflective (typically white), while the other three types of particles include three substantially non-light-scattering ("SNLS"). As mentioned above, the use of SNLS particles allows mixing of colors and provides for more color outcomes than can be achieved with the same number of scattering types of particles. These thresholds must be sufficiently separated for avoidance of cross talk, and this separation necessitates the use of high addressing voltages for some colors. The disclosed four-particle electrophoretic media can also be updated fast, require "less flashy" transitions, and produce color spectra that is pleasing to the viewer (and thus, commercially valuable). Additionally, the disclosed formulations provides for fast (e.g., less than 500 ms, e.g., less than 300 ms, e.g., less than 200 ms, e.g., less than 100 ms) updates between black and white pixels, thereby enabling fast page turns for black on white text.

In FIG. 1, it is assumed that the viewing surface of the display is at the top (as illustrated), i.e., a user views the display from this direction, and light is incident from this direction. As already noted, in preferred embodiments only one of the four types of particles used in the electrophoretic medium of the present invention substantially scatters light, and in FIG. 1 this type of particles is assumed to be the white pigment. This light-scattering white type of particles forms a white reflector against which any particles above the white type of particles (as illustrated in FIG. 1) are viewed. Light entering the viewing surface of the display passes through these types of particles, is reflected from the white type of particles, passes back through these types of particles and emerges from the display. Thus, the particles above the white type of particles may absorb various colors and the color appearing to the user is that resulting from the combination of particles above the white particles. Any particles disposed below (behind from the user's point of view) the white type of particles are masked by the white type of particles and do not affect the color displayed. Because the second, third and fourth types of particles are substantially non-light-scattering, their order or arrangement relative to each other is unimportant, but for reasons already stated, their order or arrangement with respect to the white (light-scattering) particles is critical.

More specifically, when the cyan, magenta and yellow types of particles lie below the white type of particles (Situation [A] in FIG. 1), there are no particles above the white particles and the pixel simply displays a white color. When a type of single particles is above the white type of particles, the color of that single type of particles is displayed, yellow, magenta and cyan in Situations [B], [D] and [F] respectively in FIG. 1. When two types of particles lie above the white type of particles, the color displayed is a combination of those of these two types of particles; in FIG. 1, in Situation [C], magenta and yellow types of particles display a red color, in Situation [E], cyan and magenta particles display a blue color, and in Situation [G], yellow and cyan types of particles display a green color. Finally, when all three types of colored particles lie above the white type of particles (Situation [H] in FIG. 1), all the incoming light is absorbed by the three subtractive primary colored types of particles and the pixel displays a black color.

It is possible that one subtractive primary color is rendered by a type of particles that scatters light, so that the display would comprise two types of light-scattering particles, one of which would be white and the other colored. In this case, however, the position of the light-scattering colored type of particles with respect to the other colored types of particles overlying the white type of particles would be important. For example, in rendering the color black (when all three colored types of particles lie over the white type of particles) the scattering colored type of particles cannot lie over the non-scattering colored types of particles (otherwise they will be partially or completely hidden behind the scattering type of particles and the color rendered will be that of the scattering colored type of particle, not black).

FIG. 1 shows an idealized situation in which the colors are uncontaminated (i.e., the light-scattering white type of particles completely mask any types of particles lying behind the white type of particles). In practice, the masking by the white type of particles may be imperfect so that there may be some small absorption of light by a type of particles that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. Hereinafter, "primary colors" will be used to refer to the eight colors, black, white, the three subtractive primaries and the three additive primaries as shown in FIG. 1.

FIG. 2 shows a schematic cross-sectional representation of the four types of particles of a Type I electrophoretic medium used in the present invention.

A display layer utilizing the improved electrophoretic medium includes a first (viewing) surface 23 on the viewing side, and a second surface 24 on the opposite side of the first surface 23. The electrophoretic medium is disposed between the two surfaces. Each space between two dotted vertical lines denotes a pixel. Within each pixel, the electrophoretic medium can be addressed and the viewing surface 23 of each pixel can achieve the color states shown in FIG. 1 without a need for additional layers, and without a color filter array.

As standard with electrophoretic displays, the first surface 23 includes a first light-transmissive electrode layer 21, constructed from a sheet of PET with indium tin oxide (ITO) disposed thereon. On the second surface (24), there is a second electrode layer 22, which includes a plurality of pixel electrodes 25. Such pixel electrodes are described in U.S. Pat. No. 7,046,228, the content of which is incorporated by reference by reference in its entirety herein. It is noted that while active matrix driving with a thin film transistor (TFT) backplane is mentioned for the layer of pixel electrodes, the scope of the present invention encompasses other types of electrode addressing as long as the electrodes serve the desired functions. For example, the first and second electrode layers (or top and bottom electrodes) can be contiguous. Additionally, pixel electrode backplanes different from those described in the '228 patent are also suitable, and may include active matrix backplanes capable of providing higher driving voltages than typically found with amorphous silicon thin-film-transistor backplanes.

Newly developed active matrix backplanes may include thin film transistors incorporating metal oxide materials, such as tungsten oxide, tin oxide, indium oxide, zinc oxide or more complex metal oxides such as indium gallium zirconium oxide. In these applications, a channel formation region is formed for each transistor using such metal oxide materials, allowing faster switching of higher voltages. Such metal oxide transistors also allow for less leakage in the "off" state of the thin-film transistor (TFT) than can be achieved by, for example, amorphous silicon TFTs. In a typical scanning TFT backplane comprising n lines, the transistor will be in the "off" state for approximately a proportion (n-lyn of the time required to refresh every line of the display. Any leakage of charge from the storage capacitors associated with each pixel would result in degradation of the electro-optical performance of the display. TFTs typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE. Such backplanes are able to provide driving voltages of ±30 V (or more). In some embodiments, intermediate voltage drivers are included so that the resulting driving waveforms may include five levels, or seven levels, or nine levels, or more.

One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30 V via a suitable display driver. Furthermore, a source driver capable of supplying at least five and preferably seven levels provides a different driving paradigm for a four-particle electrophoretic display system. In an embodiment, there will be two positive voltages, two negative voltages, and zero volts. In another embodiment, there will be three positive voltages, three negative voltages, and zero volts. In an embodiment, there will be four positive voltages, four negative voltages, and zero volts. These levels may be chosen within the range of about −27 V to +27 V, without the limitations imposed by top plane switching as described above.

The electrophoretic display of FIG. 2 comprises Type I electrophoretic medium of the present invention. It includes four types of electrophoretic particles in a non-polar fluid 27. A first type of particles (W−*; open circle) is negatively charged and may be surface treated so that the electrophoretic mobility of the first type of particles is dependent upon the strength of the driving electric field (discussed in detail below). In such instances, the electrophoretic mobility of this type of particles actually decreases in the presence of a stronger electric field, which is somewhat counter-intuitive.

The second type of particles (C++; gray circle) may have higher positive charge than the third type of particles. It may have a surface treatment. As indicated in FIG. 2, the types of particles are nominally white, magenta, yellow, and cyan in color to produce colors as shown in FIG. 1. However, the invention is not limited to this specific color set, nor is it limited to one reflective type of particles and three absorptive types of particles. For example, the system could include one black absorptive type of particles and three reflective types of particles of red, yellow, and blue with suitably matched reflectance spectra to produce a process white state when all three reflective particles are mixed and viewable at the surface.

The third type of particles (M+*; dark circle) is positively charged, and may also be surface treated (or purposely untreated) so that either the electrophoretic mobility of the third type of particles is dependent upon the strength of the driving electric field, or the rate of unpacking of a collection of the second and third type of particles, after having been driven to one side of the cavity containing the type of particles upon reversal of the electric field direction, is slower than the rate of unpacking of collections of the second type of particles.

A fourth type of particles (Y−; checkered circle) is negatively-charged. It may have a charge magnitude that is higher or lower than the charge magnitude of the first type of particles. Additionally, the fourth type of particles may be surface treated. The electrophoretic mobility of the fourth type of particles may or may not be dependent upon the strength of the driving electric field. That is, the fourth type of particles may have a surface treatment; however, such a surface treatment may not result in the aforementioned reduction in electrophoretic mobility with an increased electric field.

Figure 3A:
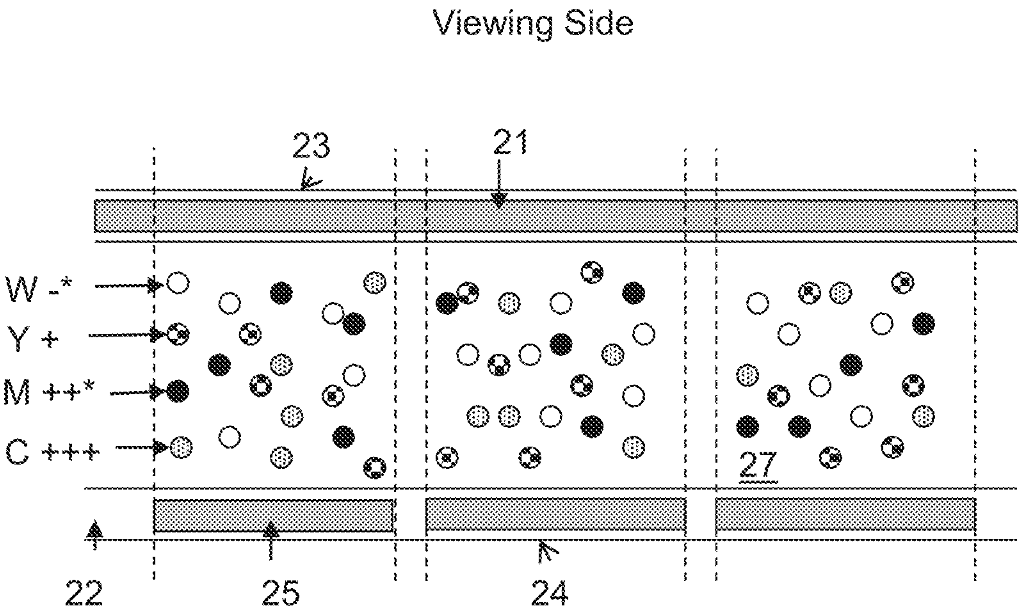
FIG. 3A is a general illustration of an electrophoretic display having a Type H electrophoretic medium with four types of particles in a non-polar fluid.

FIG. 3A shows a schematic cross-sectional representation of the four types of particles of a Type II electrophoretic medium used in the present invention. The display illustrated in FIG. 3A is similar to the display illustrated in FIG. 2, but with different electrophoretic medium (Type II in FIG. 3A versus Type I in FIG. 2).

A Type II electrophoretic medium of the invention includes four types of electrophoretic particles in a non-polar fluid 27, as shown in FIGS. 3A-3E. A first type of particles (W−*; open circle) is negatively charged and may be surface treated so that the electrophoretic mobility of the first type of particles is dependent upon the strength of the driving electric field (discussed in detail below). In such instances, the electrophoretic mobility of this type of particles actually decreases in the presence of a stronger electric field, which is somewhat counter-intuitive.

The second type of particles (C+++; gray circle) has the highest magnitude positive charge and the same type of surface treatment as the third and fourth types of particles. As indicated in FIG. 3A, the types of particles are nominally white, magenta, yellow, and cyan in color to produce colors as shown in FIG. 1. However, the invention is not limited to this specific color set, nor is it limited to one reflective type of particles and three absorptive types of particles. For example, the system could include one black absorptive type of particles and three reflective types of particles of red, yellow, and blue with suitably matched reflectance spectra to produce a process white state when all three reflective particles are mixed and viewable at the surface.

A third type of particles (M++*; dark circle) is positively charged, and may also be surface treated (or purposely untreated) so that either the electrophoretic mobility of the third type of particles is dependent upon the strength of the driving electric field, or the rate of unpacking of a collection of the third type of particles, after having been driven to one side of the cavity containing the type of particles upon reversal of the electric field direction, is slower than the rate of unpacking of collections of the second and fourth types of particles.

A fourth type of particles (Y+; checkered circle) is positive, but has a charge magnitude that is smaller than the third type of particles. Additionally, the fourth type of particles may be surface treated, but not in a way that causes the electrophoretic mobility of the fourth type of particles to depend upon the strength of the driving electric field. That is, the fourth type of particles may have a surface treatment; however, such a surface treatment does not result in the aforementioned reduction in electrophoretic mobility with an increased electric field.

FIGS. 3B-3E show schematic cross-sectional representations of different optical states of a display pixel having four types of particles (Type II) used in the invention.

In an embodiment, the first type of particle (negative) is white and scattering. The second type of particles (positive, high charge magnitude) is cyan and absorptive. The third type of particles (positive, medium charge magnitude) is magenta and absorptive. The fourth type of particles (positive, low charge magnitude) is yellow and absorptive. In another embodiment, the first type of particle (negative) is white and scattering. The second type of particles (positive, high charge magnitude) is cyan and absorptive. The third type of particles (positive, medium charge magnitude) is magenta and absorptive. The fourth type of particles (negative) is yellow and absorptive. Table 1 below shows the diffuse reflectance of exemplary yellow, magenta, cyan and white particles useful in electrophoretic media of the present invention, together with the ratio of their absorption and scattering coefficients according to the Kubelka-Munk analysis of these materials as dispersed in a poly(isobutylene) matrix.

TABLE 1

Diffuse reflectance of preferred yellow, magenta, cyan and white particles.

| Color | Volume Fraction | Diffuse reflectance of 1 μm layer on 0% black 450 nm | 550 nm | 650 nm | Ratio absorption/scatter K/S 450 nm | K/S 550 nm | K/S 650 nm |
|---|---|---|---|---|---|---|---|
| Yellow (Y1) | 0.097 | 4.5% | 0.9% | 0.5% | 9.67 | 0.38 | 0.63 |
| Yellow (Y1) | 0.147 | 4.4% | 0.9% | 0.4% | 9.84 | 0.25 | 0.02 |
| Magenta (M1) | 0.115 | 2.8% | 3.8% | 0.7% | 10.01 | 10.85 | 1.27 |

TABLE 1-continued

Diffuse reflectance of preferred yellow, magenta, cyan and white particles.

| Color | Volume Fraction | Diffuse reflectance of 1 μm layer on 0% black 450 nm | 550 nm | 650 nm | Ratio absorption/scatter K/S 450 nm | K/S 550 nm | K/S 650 nm |
|---|---|---|---|---|---|---|---|
| Magenta (M1) | 0.158 | 3.2% | 4.1% | 1.0% | 10.00 | 10.75 | 1.64 |
| Magenta (M1) | 0.190 | 3.4% | 4.1% | 1.3% | 10.09 | 10.80 | 1.03 |
| Cyan (C1) | 0.112 | 1.3% | 3.7% | 4.3% | 7.27 | 11.17 | 10.22 |
| Cyan (C1) | 0.157 | 1.5% | 3.8% | 4.3% | 7.41 | 11.30 | 10.37 |
| Cyan (C1) | 0.202 | 1.7% | 3.9% | 4.3% | 7.21 | 11.56 | 10.47 |
| White (W1) | 0.147 | 8.1% | 6.2% | 4.8% | 0.0015 | 0.0020 | 0.0026 |
| White (W1) | 0.279 | 24.9% | 20.6% | 17.0% | 0.0003 | 0.0003 | 0.0004 |
| White (W1) | 0.339 | 26.3% | 21.7% | 18.1% | 0.0001 | 0.0002 | 0.0002 |

The electrophoretic medium of the present invention may be in any of the forms discussed above. Thus, the electrophoretic medium may be unencapsulated, encapsulated in discrete capsules surrounded by capsule walls, encapsulated in sealed microcells, or in the form of a polymer-dispersed medium. The pigments are described in detail elsewhere, such as in U.S. Pat. Nos. 9,697,778, and 9,921,451. Briefly, white type of particles W1 is a silanol-functionalized light-scattering pigment (titanium dioxide) to which a polymeric material comprising lauryl methacrylate (LMA) monomers has been attached as described in U.S. Pat. No. 7,002,728. White type of particle W2 is a polymer-coated titania produced substantially as described in Example 1 of U.S. Pat. No. 5,852,196, with a polymer coating comprising an approximately 99:1 ratio of lauryl methacrylate and 2,2,2-trifluoroethyl methacrylate. Yellow type of particles Y1 is C.I. Pigment Yellow 180, used without coating and dispersed by attrition in the presence of Solsperse™ 19000, as described generally in U.S. Pat. No. 9,697,778. Yellow type of particles Y2 is C.I. Pigment Yellow 155 used without coating and dispersed by attrition in the presence of Solsperse™ 19000, as described generally in in U.S. Pat. No. 9,697,778. Yellow type of particles Y3 is C.I. Pigment Yellow 139, used without coating and dispersed by attrition in the presence of Solsperser™ 19000, as described generally in in U.S. Pat. No. 9,697,778. Yellow type of particles Y4 is C.I. Pigment Yellow 139, which is coated by dispersion polymerization, incorporating trifluoroethyl methacrylate, methyl methacrylate and dimethylsiloxane-containing monomers as described in Example 4 of U.S. Pat. No. 9,921,451. Magenta type of particles M1 is a positively-charged magenta material (dimethylquinacridone, C.I. Pigment Red 122) coated using vinylbenzyl chloride and LMA as described in U.S. Pat. No. 9,697,778 and in Example 5 of U.S. Pat. No. 9,921,451.

Magenta type of particles M2 is a C.I. Pigment Red 122, which is coated by dispersion polymerization, methyl methacrylate and dimethylsiloxane-containing monomers as described in Example 6 of U.S. Pat. No. 9,921,451. Cyan type of particles C1 is a copper phthalocyanine material (C.I. Pigment Blue 15:3), which is coated by dispersion polymerization, incorporating methyl methacrylate and dimethylsiloxane-containing monomers as described in Example 7 of U.S. Pat. No. 9,921,451. In some embodiments, it has been found that the color gamut is improved by using Ink Jet Yellow 4GC (Clariant) as the core yellow pigment, with incorporation of methyl methacrylate surface polymers. The zeta potential of this yellow pigment can be tuned with the addition of 2,2,2-trifluoroehtyl methacrylate (TFEM) monomers and monomethacrylate terminated poly(dimethylsiloxane).

Electrophoretic media additives and surface treatments for facilitating differential electrophoretic mobility, as well as proposed mechanisms for interaction between the surface treatment and surrounding charge control agents and/or free polymers, are discussed in detail in U.S. Pat. No. 9,697,778, incorporated by reference in its entirety. In such electrophoretic media, one way of controlling the interactions among the various types of particles is by controlling the kind, amount, and thickness of polymeric coatings on the particles. For example, to control the particle characteristics such that the particle-particle interactions are less between the second type of particles and the third and fourth types of particles than between, for example, the third type of particles and the fourth type of particles of the third species, the second type of particle may bear a polymeric surface treatment, while the third and fourth types of particles bear either no polymeric surface treatment or a polymeric surface treatment having a lower mass coverage per unit area of the particle surface than the second type of particles. More generally, the Hamaker constant (which is a measure of the strength of the Van der Waals interaction between two particles, the pair potential being proportional to the Hamaker constant and inversely proportional to the sixth power of the distance between the two particles) and/or the interparticle spacing need(s) to be adjusted by judicious choice of the polymeric coating(s) on the three species of particles.

As discussed in U.S. Pat. No. 9,921,451, different types of polymers may include different types of polymer surface treatment. For example, Coulombic interactions may be weakened when the closest distance of approach of oppositely charged particles is maximized by a steric barrier (typically a polymer grafted or adsorbed to the surface of one or both particles). The polymer shell may be a covalently bonded polymer made by grafting processes or chemisorption as is well known in the art, or may be physisorbed onto the particle surface. For example, the polymer may be a block copolymer comprising insoluble and soluble segments. Alternatively, the polymer shell may be dynamic in that it is a loose network of free polymer from the electrophoretic medium that is complexed with a pigment particle in the presence of an electric field and a sufficient amount and kind of charge control agent (CCA—discussed below). Thus, depending upon the strength and polarity of the electric field, a particle may have more associated polymer, which causes the particle to interact differently with the container (e.g., microcapsule or microcell) and the other particles. The extent of the polymer shell is conveniently assessed by thermal gravimetric analysis (TGA), a technique in which the temperature of a dried sample of the particles is raised and the mass loss due to pyrolysis is measured as a function of temperature. Using TGA, the proportion of the mass of the particle that is polymer can be measured, and this can be converted to a volume fraction using the known densities of the core pigments and the polymers attached to them. Conditions can be found in which the polymer coating is lost but the core pigment remains (these conditions depend upon the precise core pigment particle used). A variety of polymer combinations can be made to work as described below with respect to FIGS. 3B-3E. For example, in some embodiments a particle (typically the first and/or second particle) can have a covalently attached polymer shell that interacts strongly with the container (e.g., microcell or microcapsule). Meanwhile the other particles of the same charge have no polymer coating or complex with free polymers in the solution so that those particles have little interaction with the container. In other embodiments, a particle (typically the first and/or second particle) will have no surface coating so that it is easier for that particle to form a charge double layer and experience electrophoretic mobility reduction in the presence of strong fields.

The fluid 27 in which the four types of particles are dispersed is clear and colorless. The fluid contains the charged electrophoretic particles, which move through the fluid under the influence of an electric field. A preferred suspending fluid has a low dielectric constant (about 2), high volume resistivity (about $10^{15}$ Ohm·cm), low viscosity (less than 5 mPas), low toxicity and environmental impact, low water solubility (less than 10 parts per million (ppm), if traditional aqueous methods of encapsulation are to be used; note however that this requirement may be relaxed for non-encapsulated or certain microcell displays), a high boiling point (greater than about 90° C.), and a low refractive index (less than 1.5). The last requirement arises from the use of scattering (typically white) pigments of high refractive index, whose scattering efficiency depends upon a mismatch in refractive index between the particles and the fluid.

Organic solvents such as saturated linear or branched hydrocarbons, silicone oils, halogenated organic solvents, and low molecular weight halogen-containing polymers are some useful fluids. The fluid may comprise a single component or may be a blend of more than one component in order to tune its chemical and physical properties. Reactants or solvents for the microencapsulation process (if used), such as oil soluble monomers, can also be contained in the fluid.

The fluid preferably has a low viscosity and a dielectric constant in the range of about 2 to about 30, preferably about 2 to about 15 for high particle mobility. Examples of suitable dielectric fluids include hydrocarbons such as Isopar®, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoro-ethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-coming (DC-200).

As described in U.S. Pat. No. 7,170,670, the bistability of electrophoretic media can be improved by including in the fluid a polymer having a number average molecular weight in excess of about 20,000, this polymer being essentially non-absorbing on the electrophoretic particles; poly (isobutylene) or polydimethylsiloxane may be used for this purpose. In addition, as described in, for example, U.S. Pat. No. 6,693,620, a particle with immobilized charge on its surface sets up an electrical double layer of opposite charge in a surrounding fluid. Ionic head groups of the CCA may be ion-paired with charged groups on the electrophoretic particle surface, forming a layer of immobilized or partially immobilized charged species. Outside this layer, there is a diffuse layer that comprises charged (reverse) micelles comprising CCA molecules in the medium. In conventional DC electrophoresis, an applied electric field exerts a force on the fixed surface charges and an opposite force on the mobile counter-charges, such that slippage occurs within the diffuse layer and the particle moves relative to the fluid. The electric potential at the slip plane is known as the zeta potential.

As a result, some of the particle types within the electrophoretic medium have different electrophoretic mobilities depending upon the strength of the electric field across the electrophoretic medium. For example, when a first (low strength, i.e., around ±10 V or less) electric field is applied to the electrophoretic medium, the first type of particles move in one direction relative to the electric field, however, when a second (high strength, i.e., around ±20 V or more) electric field is applied, having the same polarity as the first electric field, the first type of particles begins to move in the opposite direction relative to the electric field. It is theorized that the behavior results from conduction within the highly non-polar fluid being mediated by charged reverse micelles or counter-charged electrophoretic particles. Accordingly, any electrochemically generated protons (or other ions) are probably transported through the non-polar fluid in micelle cores or adsorbed on electrophoretic particles. For example, as illustrated in FIG. 5B of U.S. Pat. No. 9,697,778, a positively-charged reverse micelle may approach a negative electrophoretic particle traveling in the opposite direction, wherein the reverse micelle is incorporated into the electric double layer around the negatively charged particle. The electric double layer includes both the diffuse layer of charge with enhanced counter-ion concentration and the hemi-micellar surface-adsorbed coating on the particle; in the latter case, the reverse micelle charge would become associated with the particle within the slip envelope that, as noted above, defines the zeta potential of the particle. Through this mechanism, an electrochemical current of positively-charged ions flows through the electrophoretic fluid, and the negatively-charged particles may become biased towards a more positive charge. As a result, the electrophoretic mobility, e.g., of the first negative type of particle is a function of the magnitude of the electrochemical current and the residence time of a positive charge close to the particle surface, which is a function of the strength of the electric field.

Furthermore, as also described in U.S. Pat. No. 9,697,778, positively-charged particles can be prepared that also exhibit different electrophoretic mobilities depending upon the applied electric field. In the present invention, a combination of charge control agents can be used in the electrophoretic medium to adjust the zeta potentials of the various particles.

In some embodiments, a portion of the charge control agents intended for the final formulation are added during synthesis of the electrophoretic particles to engineer the desired zeta potential and to influence the reduction in electrophoretic mobility due to a strong electric field. For example, it has been observed that adding a charge control agents during polymer grafting will result in some amount of the CCA being complexed to the particles. This can be confirmed by removing the particles from the electrophoretic medium and subsequently stripping the surface species from the pigments with THF to remove all adsorbed species. When the THF extract is evaluated with 1H NMR, it is clear that a good amount of the CCA was adsorbed to the pigment particles or complexed with the surface polymer. Experiments suggest that high CCA loading amongst the surface polymers of the particles facilitates the formation of a charge double layer around the particle in the presence of a strong electric field. For example, magenta particles having greater than 200 mg of a charge control agent (CCA) per gram of finished magenta particle have excellent staying properties in the presence of a high positive electric field. (See, e.g., FIG. 3C, and the description above.)

Table 2 shows exemplary relative zeta potentials of the three types of colored and singular white particles in a preferred embodiment.

TABLE 2

Relative zeta potentials of colored particles in the presence of relative zeta potential of white particles.

| | | White zeta potential (mV) | | | |
|---|---|---|---|---|---|
| | | −30 | 0 | 10 | 20 |
| Cyan zeta potential (mV) | 80 | 110 | 80 | 70 | 60 |
| Magenta zeta potential (mV) | 40 | 70 | 40 | 30 | 20 |
| +Yellow zeta potential (mV) | 20 | 50 | 20 | 10 | 0 |
| −Yellow zeta potential (mV) | −20 | 10 | −20 | −30 | −40 |

In an embodiment, the negative (white) particle has a zeta potential of −30 mV, and the remaining three particles are all positive relative to the white particle. Accordingly, a display comprising positive cyan, magenta, and yellow particles can switch between a black state (with all colored particles in front of the white particle with respect to the viewing surface) and a white state, with the white particle closest to the viewer, and blocking the viewer from perceiving the remaining three particles. In contrast, when the white particle has a zeta potential of 0 V, the negatively-charged yellow particle is the most negative of all the particles, and thus a display comprising this particle would switch between a yellow and a blue state. This would also occur if the white particle were positively charged. The positively-charged yellow particle, however, would be more positive than the white particle unless its zeta potential exceeded +20 mV.

The behavior of the electrophoretic media of the invention are consistent with the mobility of the white particle (represented in Table 2 as the zeta potential) being dependent upon the applied electric field. Thus, in the example illustrated in Table 2, when addressed with a low voltage the white particle might behave as though its zeta potential were −30 mV, but when addressed with a higher voltage it might behave as though its zeta potential were more positive, maybe even as high as +20 mV (matching the zeta potential of the yellow particle). Thus, when addressed with a low voltage the display would switch between black and white states but when addressed at a higher voltage would switch between blue and yellow states.

Figure 3B:
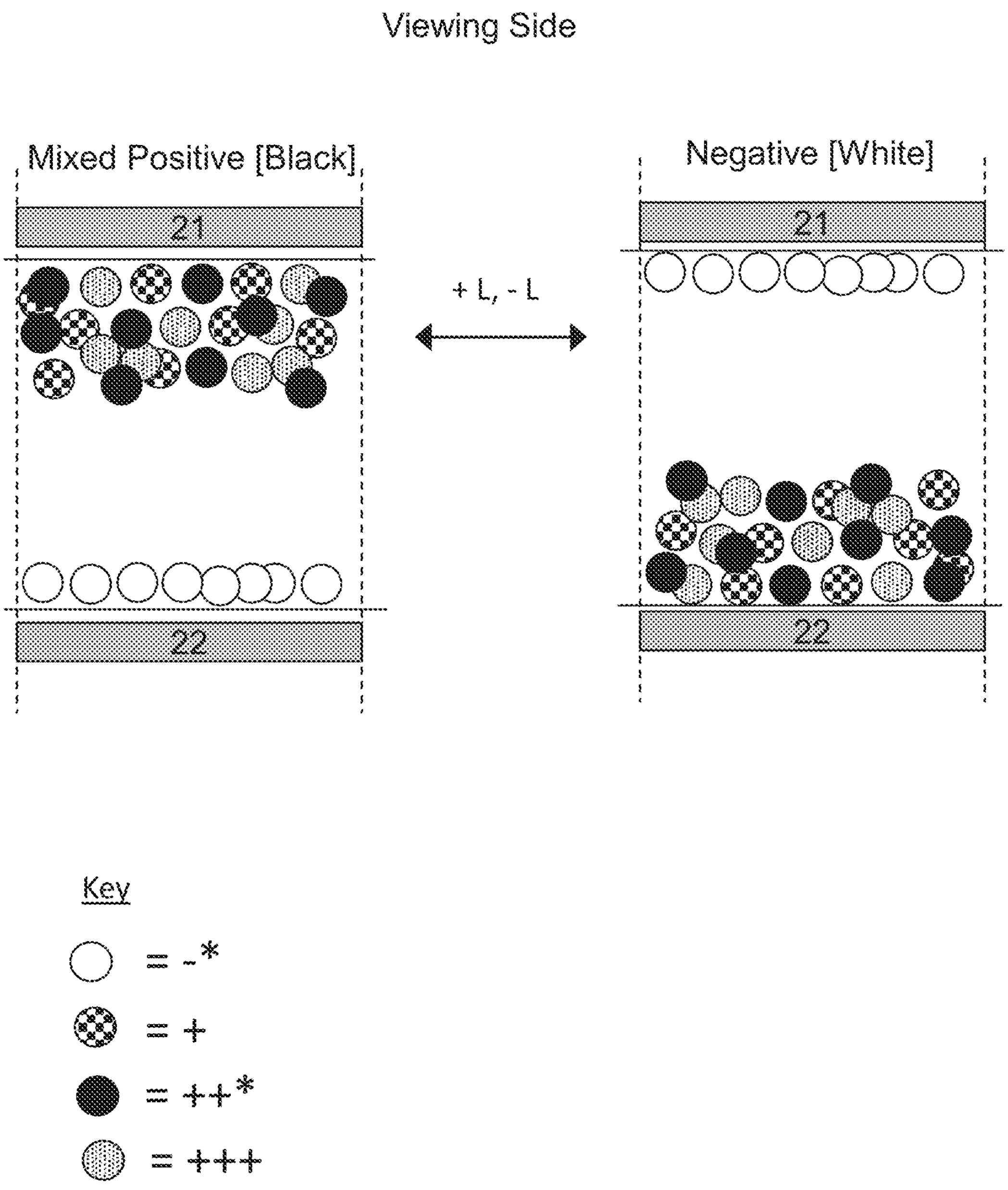
FIG. 3B illustrates a transition between a first optical state having all of the particles of a first charge polarity at the viewing surface and a second optical state having the particles with the second (opposite) polarity at the viewing surface.
Figure 3C:
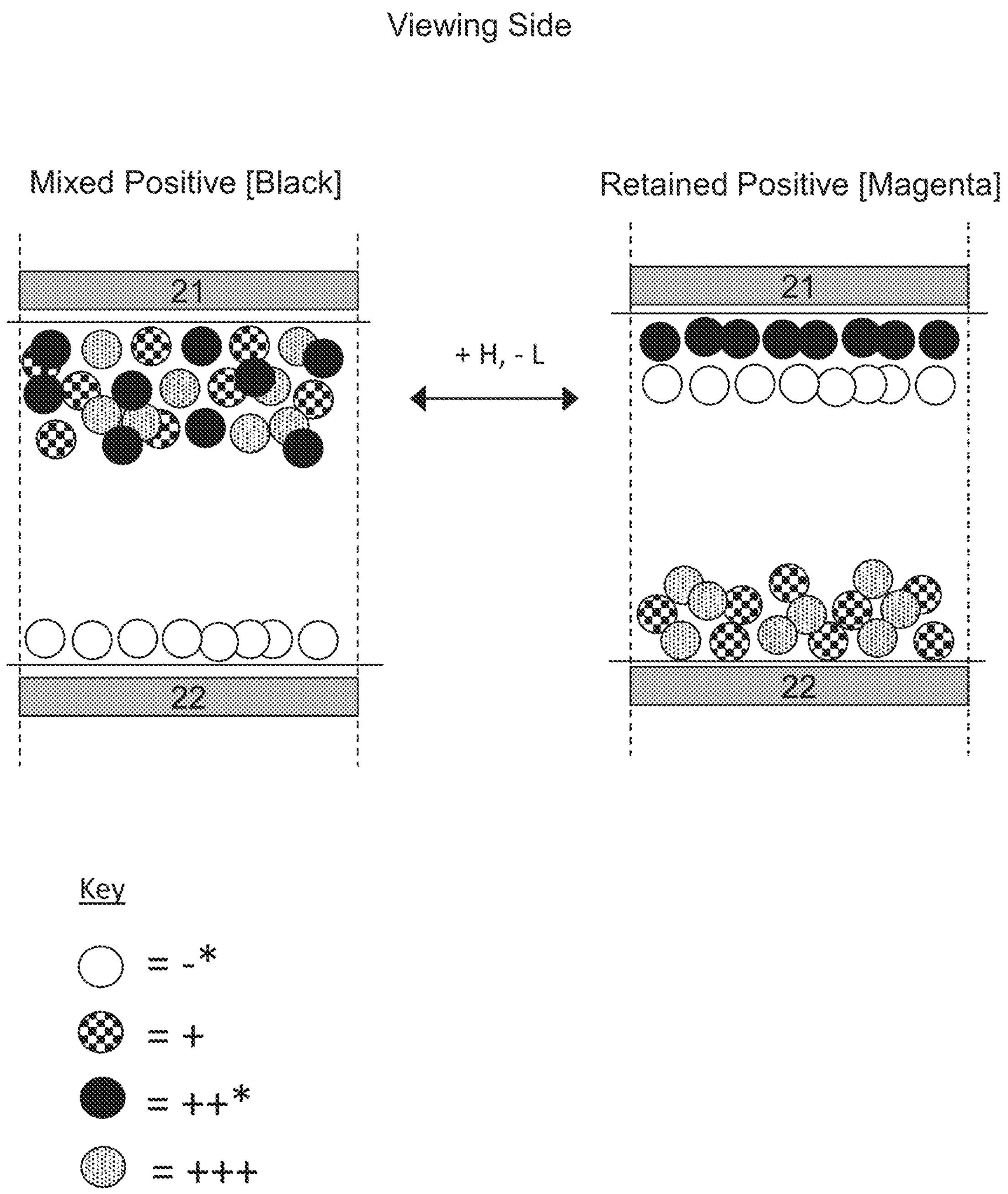
FIG. 3C illustrates a transition between a first optical state having all of the particles of the first charge polarity at the viewing surface and a third optical state having the particles with the second (opposite) polarity behind the middle charged particles of the first polarity, which are located at the viewing surface.
Figure 3D:
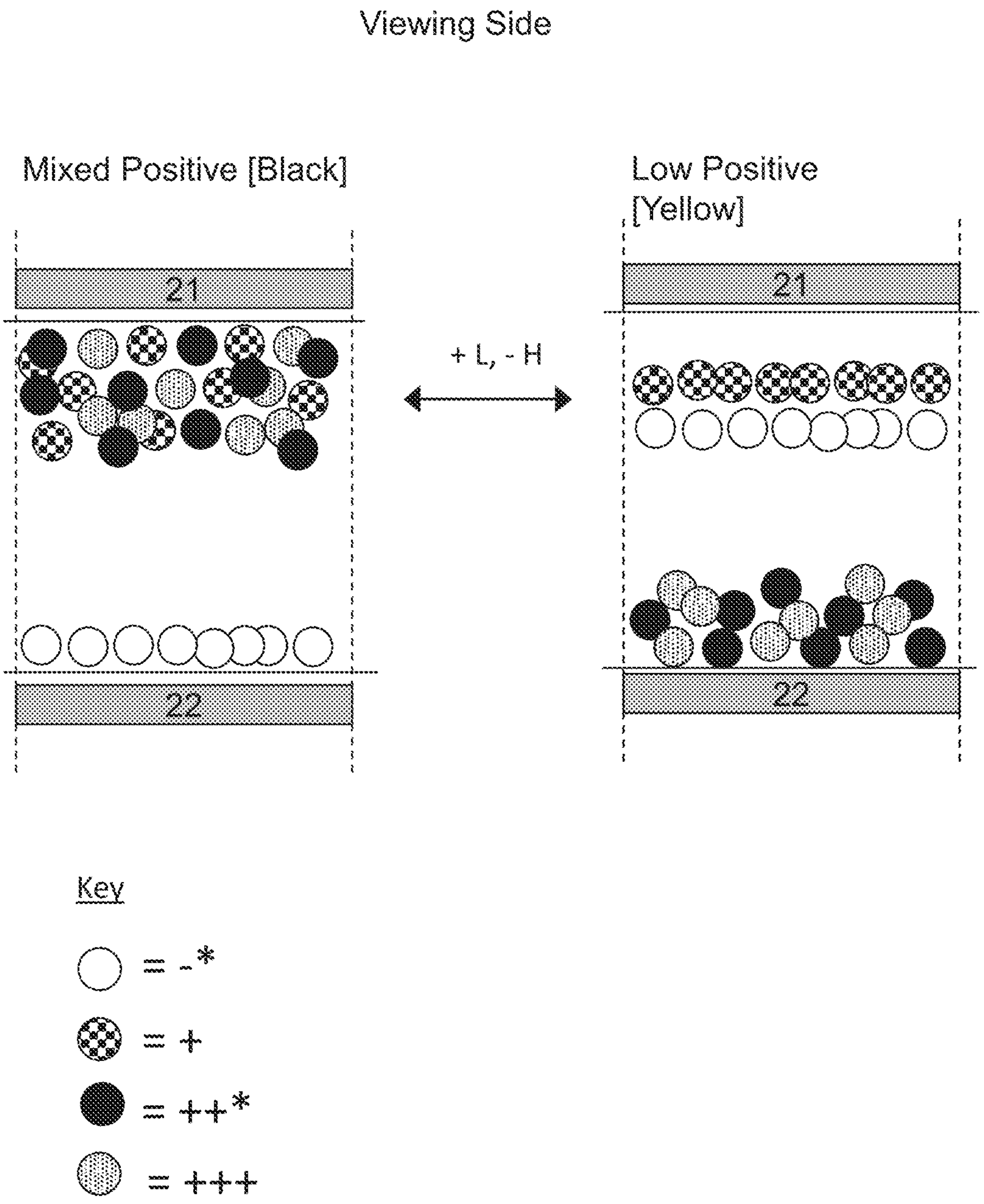
FIG. 3D illustrates a transition between a first optical state having all of the particles of the first charge polarity at the viewing surface and a fourth optical state having the particles with the second (opposite) polarity behind the low charged particles of the first polarity, which are located at the viewing surface.
Figure 3E:
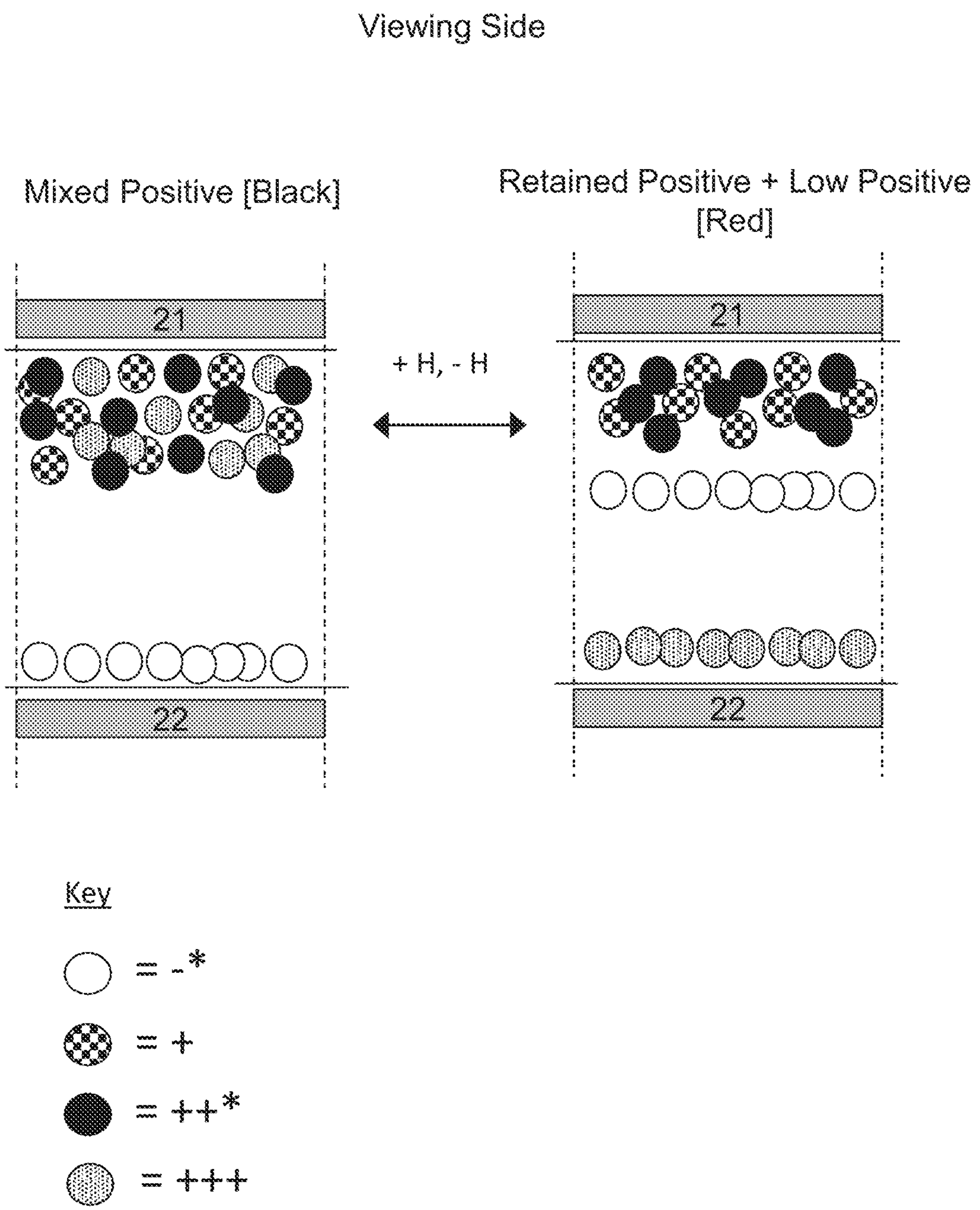
FIG. 3E illustrates a transition between a first optical state having all of the particles of the first charge polarity at the viewing surface and a fifth optical state having the particles with the second (opposite) polarity behind a combination of the low charged particles and the medium charged particles of the first polarity, which are located at the viewing surface.

The motion of the various particles in the presence of a high (e.g., "±H", e.g., ±20 V, e.g., ±25 V) electric field and a low (e.g., "±L", e.g., ±5 V, e.g., ±10 V) electric field are shown in FIGS. 3B-3E. For the purposes of illustration, each box bounded by dashed lines represents a pixel bounded by a first light-transmissive electrode layer 21 (front electrode) and a second electrode layer 22 (back electrode), which may comprise a pixel electrode of an active matrix, however it may also be a light-transmissive electrode, or a segmented electrode, etc. Starting from a first state, in which all of the positive particles are present at the viewing surface (nominally black), the electrophoretic medium can be driven to four different optical states, as shown in FIGS. 3B-3E. In the preferred embodiment, this results in a white optical state (FIG. 3B), a magenta optical state (FIG. 3C), a yellow optical state (FIG. 3D), and a red optical state (FIG. 3E). It should be evident that the remaining four optical states of FIG. 1 can be achieved by reversing the order of the initial state and the driving electric fields, as shown in short hand in FIG. 4.

When addressed with a low voltage, as in FIG. 3B, the particles behave according to their relative zeta potentials with relative velocities illustrated by the arrows for the case when a negative voltage is applied to the backplane. Thus, in this example, the cyan particles move faster than the magenta particles, which move faster than the yellow particles. The first (positive) pulse does not change the positions of the particles, since they are already restricted in motion by the walls of the enclosure. The second (negative) pulse exchanges the positions of the colored and white particles, and thus the display switches between black and white states, albeit with transient colors reflecting the relative mobilities of the colored particles. Reversing the starting positions and polarities of the pulses allows for a transition from white to black. Accordingly, this embodiment provides black-white updates that require lower voltages (and consume less power) as compared to other black and white formulations achieved with multiple colors via either a process black or a process white.

In FIG. 3C, the first (positive) pulse is of a high positive voltage, sufficient to reduce the mobility of the magenta particle (i.e., the particle of intermediate mobility of the three positively-charge colored particles). Because of the reduced mobility, the magenta particles essentially remain frozen in place, and a subsequent pulse in the opposite direction, of low voltage, moves the cyan, white and yellow particles more than the magenta particles, thereby producing a magenta color at the viewing surface, with the negative white particles behind the magenta particles. Importantly, if the starting position and the polarities of the pulses are reversed, (equivalent to viewing the display from the side opposite the viewing surface, i.e., through second electrode layer 22), this pulse sequence would produce a green color (i.e., a mixture of yellow and cyan particles).

In FIG. 3D, the first pulse is of a low voltage that does not significantly reduce the mobility of the magenta particles or the white particles. However, the second pulse is of a high negative voltage that reduces the mobility of the white particles. This allows more effective racing between the three positive particles, such that the slowest type of particles (yellow in this example) remains visible in front of the white particle, whose movement was diminished with the earlier negative pulse. Notably, the yellow particles to not make it to the top surface of the cavity containing the particles. Importantly, if the starting position and the polarities of the pulses are reversed, (equivalent to viewing the display from the side opposite the viewing surface, i.e., through second electrode layer 22), this pulse sequence would produce a blue color (i.e., a mixture of magenta and cyan particles).

Finally, FIG. 3E shows that when both pulses are of high voltage, the magenta particle mobility would be reduced by the first high positive pulse, and the racing between cyan and yellow would be enhanced by the reduction in white mobility caused by the second high negative pulse. This produces a red color. Importantly, if the starting position and the polarities of the pulses are reversed, (equivalent to viewing the display from the side opposite the viewing surface, i.e., through second electrode layer 22), this pulse sequence would produce a cyan color.

To obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again, the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. The aforementioned voltages are relative to a common front electrode (first light-transmissive electrode layer) that is conventionally provided on the opposed side of the electro-optic medium from the non-linear array and extends across the whole display. After a pre-selected interval known as the "line address time" the selected row is deselected, the next row is selected, and the voltages on the column drivers are changed so that the next line of the display is written. This process is repeated so that the entire display is written in a row-by-row manner.

Conventionally, each pixel electrode has associated therewith a capacitor electrode such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 5:
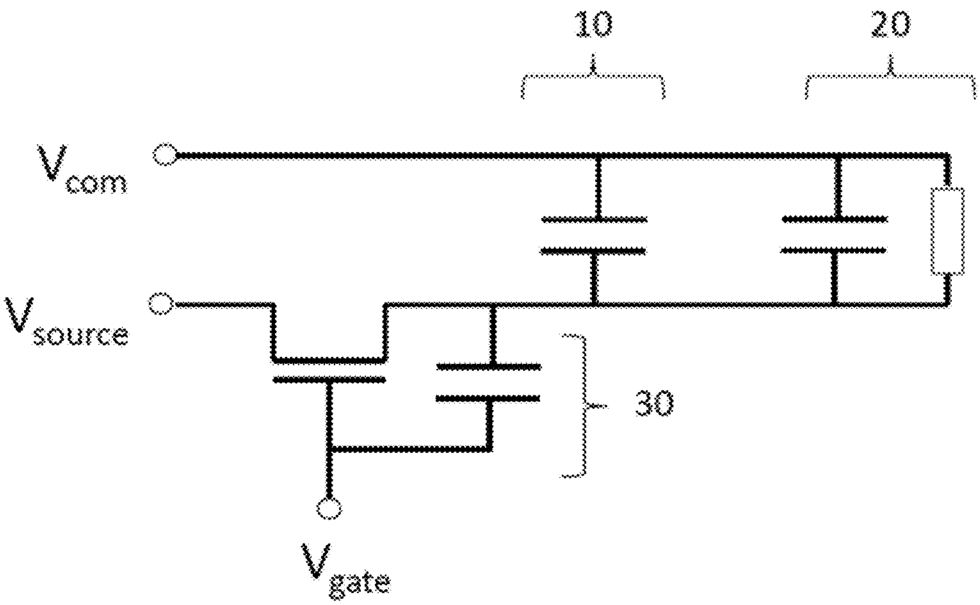
FIG. 5 illustrates an exemplary equivalent circuit of a single pixel of an electrophoretic display.

FIG. 5 of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. In some embodiments, to compensate for the unwanted "kickback voltage", a common potential $V_{com}$, may be supplied to the first electrode layer (front electrode) and the capacitor electrode associated with each pixel, such that, when $V_{com}$ is set to a value equal to the kickback voltage ($V_{KB}$), every voltage supplied to the display may be offset by the same amount, and no net DC-imbalance experienced.

Problems may arise, however, when $V_{com}$ is set to a voltage that is not compensated for the kickback voltage. This may occur when it is desired to apply a higher voltage to the display than is available from the backplane alone. It is well known in the art that, for example, the maximum voltage applied to the display may be doubled if the backplane is supplied with a choice of a nominal +V, 0, or −V, for example, while $V_{com}$ is supplied with −V. The maximum voltage experienced in this case is +2 V (i.e., at the backplane relative to the top plane), while the minimum is zero. If negative voltages are needed, the $V_{com}$ potential must be raised at least to zero. Waveforms used to address a display with positive and negative voltages using top plane switching must therefore have particular frames allocated to each of more than one $V_{com}$ voltage setting.

A set of waveforms for driving a color electrophoretic display having four particles described in U.S. Pat. No. 9,921,451, incorporated by reference herein. In U.S. Pat. No. 9,921,451, seven different voltages are applied to the pixel electrodes: three positive, three negative, and zero. However, in some embodiments, the maximum voltages used in these waveforms are higher than that which can be handled by amorphous silicon thin-film transistors. In such instances, suitable high voltages can be obtained by the use of top plane switching. When (as described above) $V_{com}$ is deliberately set to $V_{KB}$, a separate power supply may be used. It is costly and inconvenient, however, to use as many separate power supplies as there are $V_{com}$ settings when top plane switching is used. Furthermore, top plane switching is known to increase kickback, thereby degrading the stability of the color states.

A display device may be constructed using an electrophoretic medium of the invention in several ways that are known in the prior art. The electrophoretic medium may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic medium may be dispensed directly on a thin open-cell grid that has been arranged on a backplane including an active matrix of pixel electrodes.

The filled grid can then be top-sealed with an integrated protective sheet/light-transmissive electrode.

Figure 6:
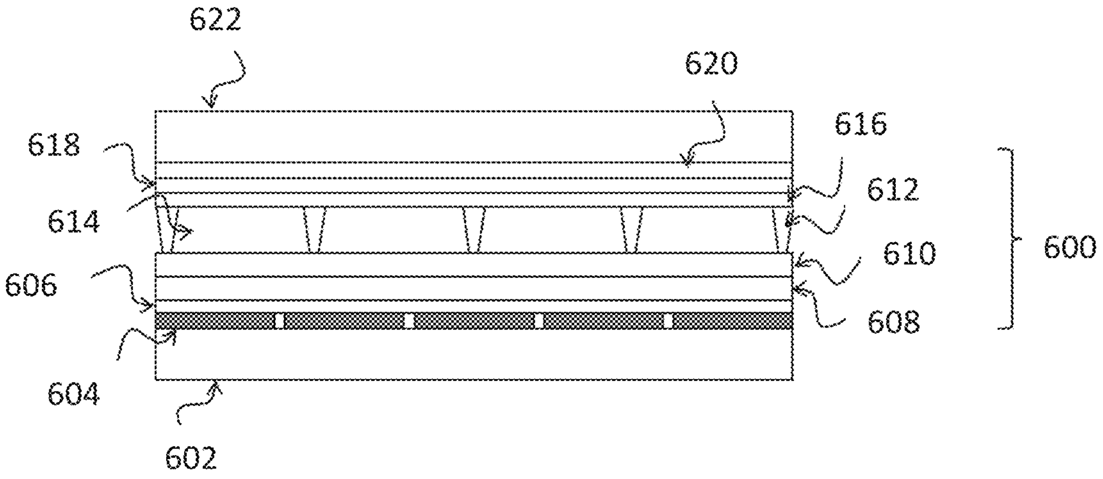
FIG. 6 shows the layers of an exemplary microcell electrophoretic color display.

FIG. 6 shows a schematic, cross-sectional drawing (not to scale) of a display structure 600 suitable for use with the invention. In display 600, the electrophoretic medium is illustrated as being confined to microcells, although equivalent structures incorporating microcapsules may also be used. Substrate 602, which may be glass or plastic, bears a second electrode layer comprising pixel electrodes 604 that are either individually addressed segments or associated with thin film transistors in an active matrix arrangement. The combination of substrate 602 and the second electrode layer that comprises pixel electrodes 604 is conventionally referred to as the back plane of the display. Layer 606 is an optional dielectric layer according to the invention applied to the backplane. Methods for depositing a suitable dielectric layer are described in U.S. patent application Ser. No. 16/862,750, incorporated by reference. The front plane of the display comprises transparent substrate 622 that bears a first light-transmissive electrode layer 620, which may be formed by an electrically conductive coating. Overlying first light-transmissive layer 620 is an optional dielectric layer 618. Layer (or layers) 616 is a polymeric layer that may comprise a primer layer for adhesion of microcells to the first light-transmissive electrode layer 620 and some residual polymer comprising the bottom of the microcells. The walls of the microcells 612 are used to contain the electrophoretic medium 614. The microcells are sealed with sealing layer 610 and the whole front plane structure may be adhered to the backplane using electrically-conductive adhesive layer 608. Processes for forming the microcells are described in the prior art, e.g., in U.S. Pat. No. 6,930,818. In some instance, the microcells are less than 20 μm in depth, e.g., less than 15 μm in depth, e.g., less than 12 μm in depth, e.g., about 10 μm in depth, e.g., about 8 μm in depth.

Most commercial electrophoretic displays use amorphous silicon based thin-film transistors (TFTs) in the construction of active matrix backplanes because of the wider availability of fabrication facilities and the costs of the various starting materials. Unfortunately, amorphous silicon thin-film transistors become unstable when supplied gate voltages that would allow switching of voltages higher than about +/−15 V Nonetheless, as described below, the performance of ACeP is improved when the magnitudes of the high positive and negative voltages are allowed to exceed +/−15 V. Accordingly, as described in previous disclosures, improved performance is achieved by additionally changing the bias of the first light-transmissive electrode with respect to the bias on the backplane pixel electrodes, also known as top-plane switching. Thus, if a voltage of +30 V (relative to the backplane) is needed, the top plane may be switched to −15 V while the appropriate backplane pixel is switched to +15 V. Methods for driving a four-particle electrophoretic system with top-plane switching are described in greater detail in, for example, U.S. Pat. No. 9,921,451.

These waveforms require that each pixel of the display can be driven at five different addressing voltages, designated $+V_{high}$, $+V_{low}$, 0, $-V_{low}$ and $-V_{high}$, illustrated as 30 V, 15 V, 0, −15 V and −30 V. In practice, it may be preferred to use a larger number of addressing voltages. If only three voltages are available (i.e., $+V_{high}$, 0, and $-V_{high}$) it may be possible to achieve the same result as addressing at a lower voltage (say, $V_{high}$ where n is a positive integer >1) by addressing with pulses of voltage $V_{high}$ but with a duty cycle of 1/n.

Figure 4:
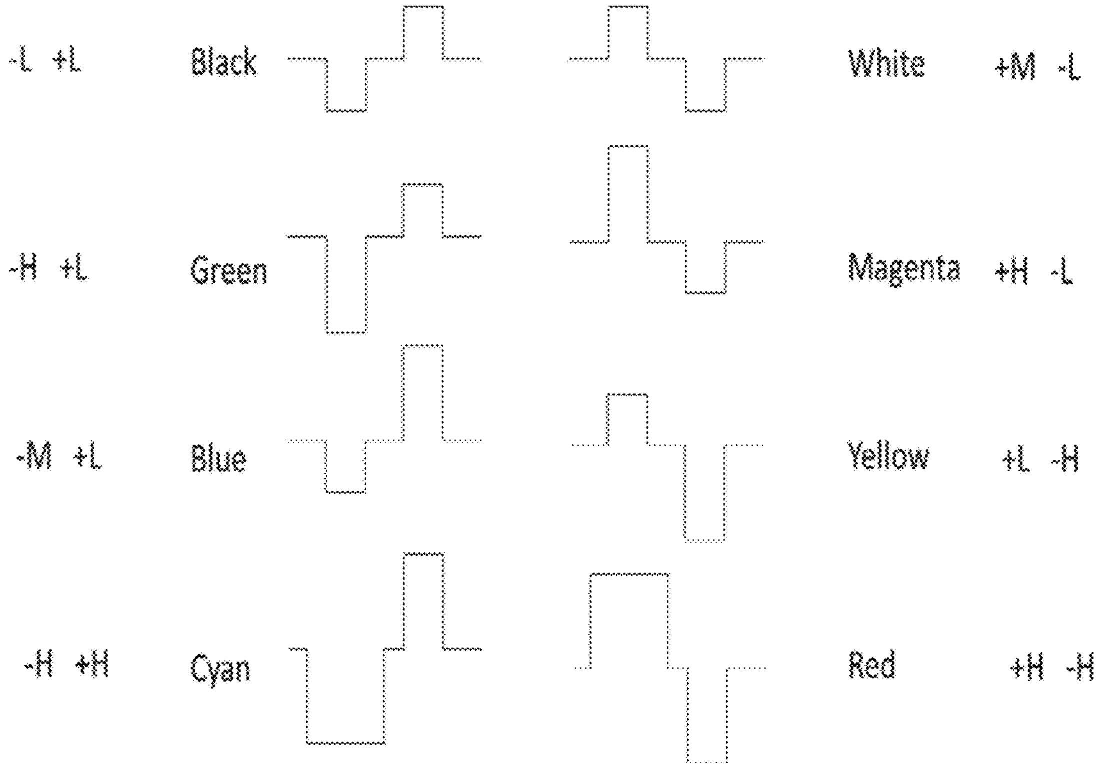
FIG. 4 shows exemplary push-pull drive schemes for addressing an electrophoretic medium including three subtractive particles and a scattering (white) particle.

FIG. 4 shows typical waveforms (in simplified form) used to drive a four-particle color electrophoretic display system described above. Such waveforms have a “push-pull” structure: i.e., they consist of a dipole comprising two pulses of opposite polarity. The magnitudes and lengths of these pulses determine the color obtained. At a minimum, there should be five such voltage levels. FIG. 4 shows high and low positive and negative voltages, as well as zero volts. Typically, “low” (L) refers to a range of about 5-15 V, while “high” (H) refers to a range of about 15-30 V In general, the higher the magnitude of the “high” voltages, the better the color gamut achieved by the display. In some embodiments an addition “medium” (M) level is used, which is typically around 15 V; however, the value for M will depend somewhat on the composition of the particles, as well as the environment of the electrophoretic medium.

Although FIG. 4 shows the simplest dipoles required to form colors, it will be appreciated that practical waveforms may multiple repetitions of these patterns, or other patterns that are aperiodic and use more than five voltage levels.

Of course, achieving the desired color with the driving pulses of FIG. 4 is contingent on the particles starting the process from a known state, which is unlikely to be the last color displayed on the pixel. Accordingly, a series of reset pulses precede the driving pulses, which increases the amount of time required to update a pixel from a first color to a second color. The reset pulses are described in detail in U.S. Pat. No. 10,593,272, incorporated by reference. The lengths of these pulses (refresh and address) and of any rests (i.e., periods of zero voltage between them may be chosen so that the entire waveform (i.e., the integral of voltage with respect to time over the whole waveform) is DC balanced (i.e., the integral of voltage over time is substantially zero). DC balance can be achieved by adjusting the lengths of the pulses and rests in the reset phase so that the net impulse supplied in the reset phase is equal in magnitude and opposite in sign to the net impulse supplied in the address phase, during which phase the display is switched to a particular desired color. As shown in the FIGS. 3B-3E, however, the starting state for the eight primary colors is either a black or a white state, which can be achieved with a sustained low voltage driving pulse. The simplicity of achieving this start state further reduces the time of updates between states, which is more pleasing for the user and also reduces the amount of power consumed (thus increasing battery life).

In addition, the foregoing discussion of the waveforms, and specifically the discussion of DC balance, ignores the question of kickback voltage. In practice, as previously, every backplane voltage is offset from the voltage supplied by the power supply by an amount equal to the kickback voltage $V_{KB}$. Thus, if the power supply used provides the three voltages +V, 0, and −V, the backplane would actually receive voltages $V+V_{KB}$, $V_{KB}$, and $-V+V_{KB}$ (note that $V_{KB}$, in the case of amorphous silicon TFTs, is usually a negative number). The same power supply would, however, supply +V, 0, and −V to the first electrode (front electrode) without any kickback voltage offset. Therefore, for example, when the first electrode (front electrode) is supplied with −V the display would experience a maximum voltage of $2V+V_{KB}$ and a minimum of $V_{KB}$. Instead of using a separate power supply-to-supply $V_{KB}$ to the first electrode (front electrode), which can be costly and inconvenient, a waveform may be divided into sections where the first electrode (front electrode) is supplied with a positive voltage, a negative voltage, and $V_{KB}$.

Microcell Electrophoretic Displays.

As shown in FIG. 6, a typical microcell electrophoretic display comprises a first light-transmissive electrode layer, a microcell layer comprising a plurality of microcells, and a second electrode layer comprising pixel electrodes. Each of the plurality of microcells has an opening. The plurality of microcells contain electrophoretic medium. A sealing layer spans the openings of the plurality of microcells. The sealing layer may be formed by an aqueous sealing composition. As described in U.S. patent application Ser. No. 18/055,072, filed on Nov. 14, 2022, the aqueous sealing composition affects the volume resistivity of the sealing layer. This reference is incorporated by reference herein in its entirety. Specifically, it was found that aqueous sealing compositions, which comprise a water-soluble ether, provide reduce the volume resistivity of the sealing layer, affecting the display performance. The water-soluble ether may have weight average molecular weight of from 75 to 5,000 Dalton. The water-soluble ether may be represented by Formula I, Formula II, or Formula III, shown above. The water-soluble ether may be selected from the group consisting of ethylene glycol monomethyl ether, ethylene glycol monoethyl ether, ethylene glycol mono-n-propyl ether, ethylene glycol monoisopropyl ether, ethylene glycol n-monobutyl ether, ethylene glycol monoisobutyl ether, ethylene glycol mono-t-butyl ether, ethylene glycol monobenzyl ether, ethylene glycol monophenyl ether, ethylene glycol dimethyl ether, ethylene glycol diethyl ether, ethylene glycol di-n-propyl ether, ethylene glycol diisopropyl ether, diethylene glycol monomethyl ether, diethylene glycol monoethyl ether, diethylene glycol mono-n-propyl ether, diethylene glycol monoisopropyl ether, diethylene glycol n-monobutyl ether, diethylene glycol monoisobutyl ether, diethylene glycol mono-t-butyl ether, diethylene glycol monobenzyl ether, diethylene glycol monophenyl ether, diethylene glycol dimethyl ether, diethylene glycol diethyl ether, diethylene glycol ethyl methyl ether, diethylene glycol di-n-propyl ether, diethylene glycol diisopropyl ether, diethylene glycol di-n-butyl, triethylene glycol monomethyl ether, triethylene glycol monoethyl ether, triethylene glycol mono-n-propyl ether, triethylene glycol monoisopropyl ether, triethylene glycol n-monobutyl ether, triethylene glycol monoisobutyl ether, triethylene glycol mono-t-butyl ether, triethylene glycol monobenzyl ether, triethylene glycol monophenyl ether, triethylene glycol dimethyl ether, triethylene glycol diethyl ether, triethylene glycol di-n-propyl ether, triethylene glycol diisopropyl ether, tetraethylene glycol monomethyl ether, tetraethylene glycol monoethyl ether, triethylene glycol monophenyl ether, tetraethylene glycol dimethyl ether, polyethylene glycol monomethyl ether, polyethylene glycol monoethyl ether, polyethylene glycol monophenyl ether, propylene glycol monomethyl ether, propylene glycol monoethyl ether, propylene glycol mono-n-propyl ether, propylene glycol monoisopropyl ether, propylene glycol mono-n-butyl ether, propylene glycol monoisobutyl ether, propylene glycol monophenyl ether, propylene glycol dimethyl ether, propylene glycol diethyl ether, dipropylene glycol monomethyl ether, dipropylene glycol monoethyl ether, dipropylene glycol mono-n-propyl ether, dipropylene glycol monoisopropyl ether, dipropylene glycol mono-n-butyl ether, dipropylene glycol monoisobutyl ether, dipropylene glycol dimethyl ether, dipropylene glycol diethyl ether, dipropylene glycol di-n-propyl ether, dipropylene glycol diisopropyl ether, tripropylene glycol monomethyl ether, tripropylene glycol monoethyl ether, tripropylene glycol mono-n-propyl ether, tripropylene glycol monoisopropyl ether, tripropylene glycol mono-n-butyl ether, tripropylene glycol monoisobutyl ether, or mixtures thereof. The aqueous sealing composition may comprise the water-soluble ether from 1.0 weight % to 40 weight % by weight of the aqueous sealing composition excluding water. The sealing layer may contain the water-soluble ether at a content of from 0.5 weight % to 25 weight % by weight of the sealing film. The water-soluble ether may optionally comprise a hydroxyl group.

The inventors of the present invention observed that inclusion of the water soluble ether in the electrophoretic medium improves the color gamut that can be achieved electro-optic performance of the display, as shown in the Examples section below.

EXAMPLES

Example 1: Preparation of White Particle Dispersion

A dispersion of titanium dioxide pigment was prepared as described in U.S. Pat. No. 7,002,728. The preparation includes silane treatment of titanium dioxide particles, followed by covalent attachment of poly(lauryl methacrylate) onto the silane-treated pigment.

Figure 7:
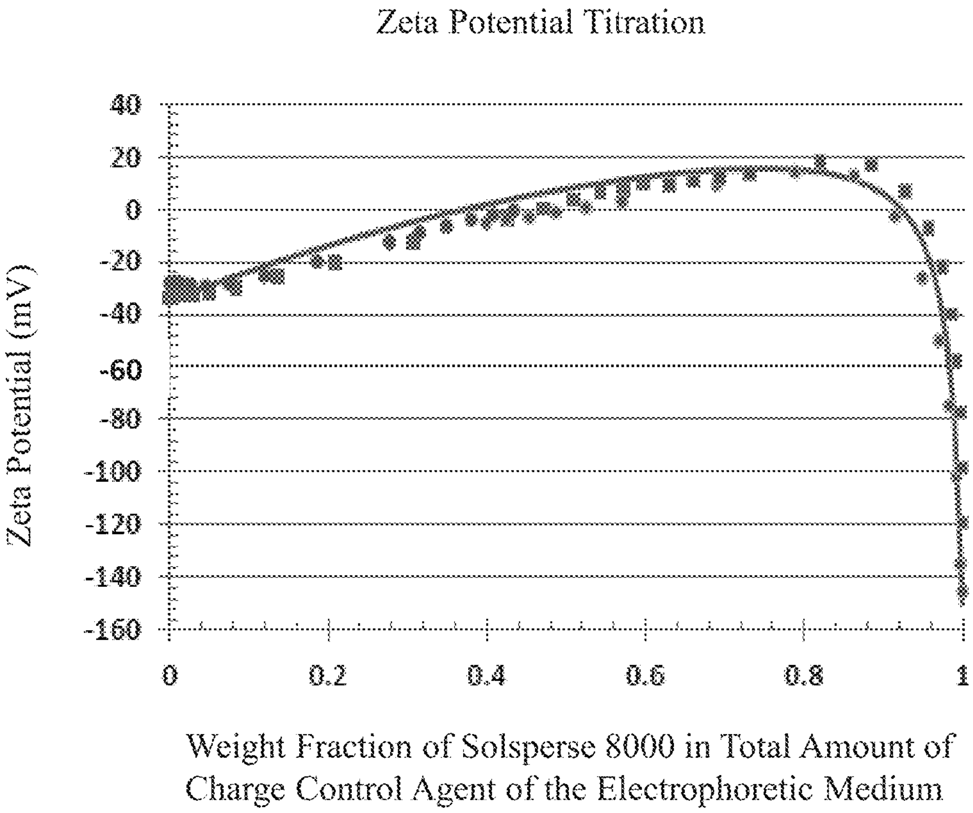
FIG. 7 shows a graph of zeta potential versus the weight ratio of the charge control agent in electrophoretic medium comprising white pigment having a polymeric surface treatment.

Example 2. Zeta Potential Determination of White Particles in Various Electrophoretic Media Mixtures of this dispersion from Example 1 with various combinations of charge control agents (Solsperse™ 19000 and Solsperse™ 8000) were prepared. The zeta potential of the white particles of each mixture was determined using Colloidal Dynamics AcoustoSizer II and ZetaProbe on samples dispersed in Isopar G. A graph of the zeta potential of the particles versus the weight fraction of Solsperse™ 8000 in the total weight of the charge control agents (Solsperse™ 8000+Solsperse™ 19000) is provided in FIG. 7. FIG. 7 shows that the zeta potential of the white particles in an electrophoretic medium that comprises only Solsperse™ 19000 (and no Solsperse™ 8000) is negative. Addition of Solsperse™ 8000 leads to the zeta potential becoming progressively less negative and, at weight fraction of Solsperse™ 8000 of approximately 0.4 the zeta potential of the white particles become positive. Possibly, if a sufficient quantity of Solsperse™ 8000 is adsorbed on the particles, the adsorbed amount of the positively charged Solsperse™ 19000 increases, modifying the charge on the particle surface. The data of FIG. 7 demonstrate that the surface charge of electrophoretic particles can be controlled by modifying the nature and quantity of the charged control agents used.

Example 3: Preparation of Type I Electrophoretic Medium

Three different electrophoretic media A, B, C were prepared according to Example 11 of U.S. Pat. No. 10,678,111, except that the charge control agent was the compound of Formula IV ($R_1$ being polyricinoleic acid; MW 9,000), instead of Solsperser™ 19000 that was used in U.S. Pat. No. 10,678,111. The electrophoretic medium comprises white particles (W1), cyan particles (C1), and magenta particles (M1) according to U.S. Pat. No. 10,678,111. The electrophoretic medium further comprised yellow pigment (Pigment Yellow 155; Ink Jet Yellow 4GC supplied by Clariant, Basel, Switzerland) dispersed as described in Example 11 of U.S. Pat. No. 10,678,111. All three electrophoretic media A, B, and C also comprise polydimethylsiloxane (PDMS DMS-T72, with molecular weight ca. 700,000 available from Gelest Corporation) at concentration of 0.9 weight percent by weight of the electrophoretic medium composition. The polydimethylsiloxane was added to serve as an image stabilizer. Electrophoretic medium A does not comprise Solsperse™ 8000. Electrophoretic medium B comprises Solsperse™ 8000 at a concentration of 140 mg of charge control agent per gram of the yellow pigment. Electrophoretic medium C comprises Solsperse™ 8000 at a concentration of 280 mg of charge control agent per gram of the yellow pigment. Table 3 provides the concentrations of the particles in the electrophoretic media as a weight percent of each type of particles by weight of the electrophoretic medium composition.

TABLE 3

Concentration of the particle types in electrophoretic media A, B, and C

| | Content (weight %) |
|---|---|
| White | 31.5 |
| Cyan | 3.2 |
| Magenta | 2.4 |
| Yellow | 2.6 |

Example 4: Preparation of Electrophoretic Displays A, B, and C

Electrophoretic Media A, B, and C from Example 3 were used to prepare electrophoretic displays A, B, and C, respectively.

Electrophoretic displays A, B, and C from Example 4 (that were prepared from electrophoretic media A, B, and C respectively) were addressed with square wave pulses of duration 500 ms having voltages varying between +24V and −24V in one-volt intervals at 25° C. The rate of change of density was evaluated using an electro-optic measurement bench including a spectrophotometer. See D. Hertel, "Optical measurement standards for reflective e-paper to predict colors displayed in ambient illumination environments," *Color Research & Application,* 43, 6, (907-921), (2018).

Figure 8:
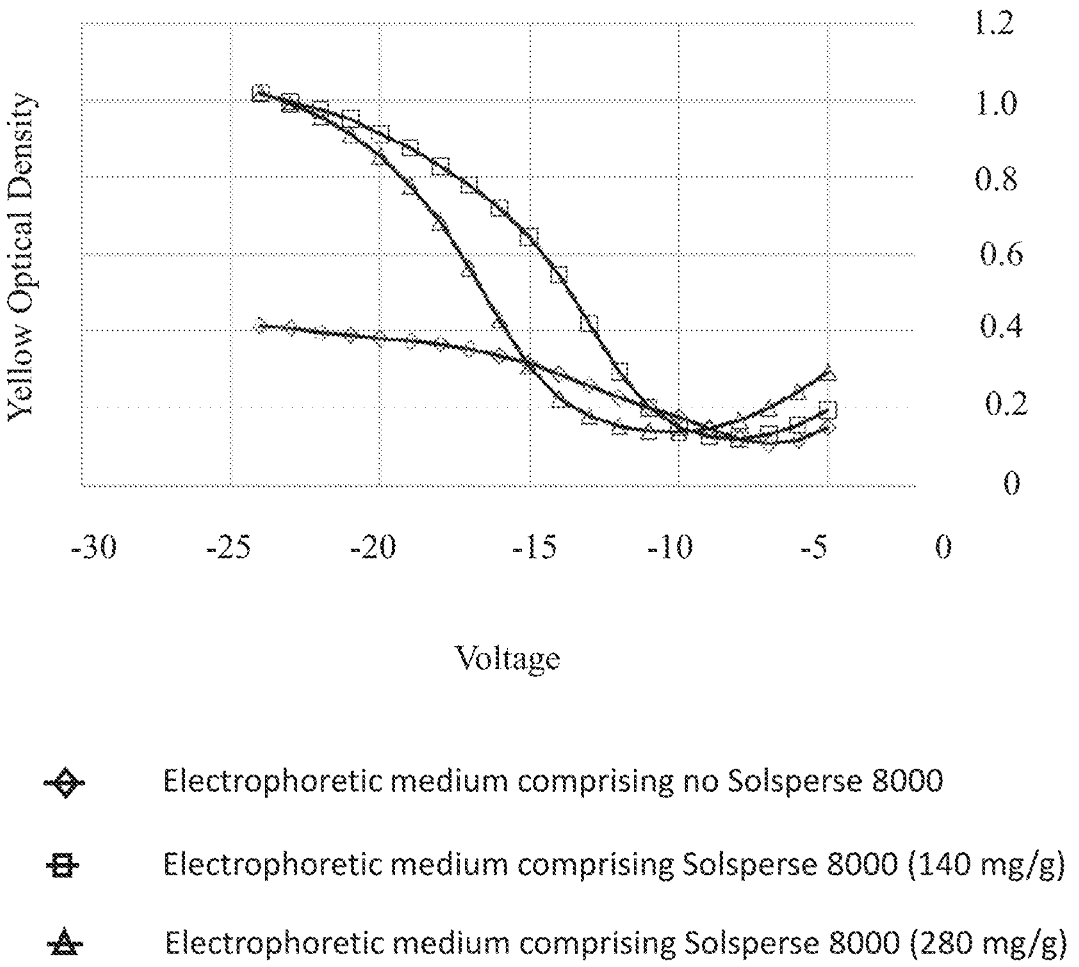
FIG. 8 shows graphs of the color of the white optical state versus applied voltage of an electrophoretic display comprising electrophoretic medium having white, yellow, cyan, and magenta particles, and two charge control agents at three different ratios.

The rate of change was higher for electrophoretic displays B and C compared to that for electrophoretic displays A as shown in FIGS. 8A-8C. FIGS. 8A, 8B and 8C show the optical appearance of the displays containing electrophoretic media A, B and C, respectively, where voltage is on the x-axis and time on the y-axis.

The color of the white state of each of the electrophoretic displays A, B, and C were determined at the end of a 500 ms drive at various negative voltages. This investigation demonstrated that the separation of white and yellow particles was more complete in displays B and C than in display A, display A having no Solsperse™ 8000. It is preferred that the voltage window available for making a transition between white and black states be as wide as possible with simple voltage pulses. The investigation showed that in display A, having electrophoretic medium A comprising no Solsperse™ 8000, the white state was contaminated with yellow at voltages more negative than about −8V. For display B having electrophoretic medium B containing 140 mg Solsperse™ 8000 per gram of yellow pigment, the white state was contaminated at voltages more negative than about −10V, whereas for electrophoretic medium C there was little yellow contamination even when addressing at −13V. It was also found that the white/yellow threshold was sharper for displays B and C, comprising electrophoretic medium B and C that contain Solsperse™ 8000 than the display A having electrophoretic medium without the additive.

Figure 9:
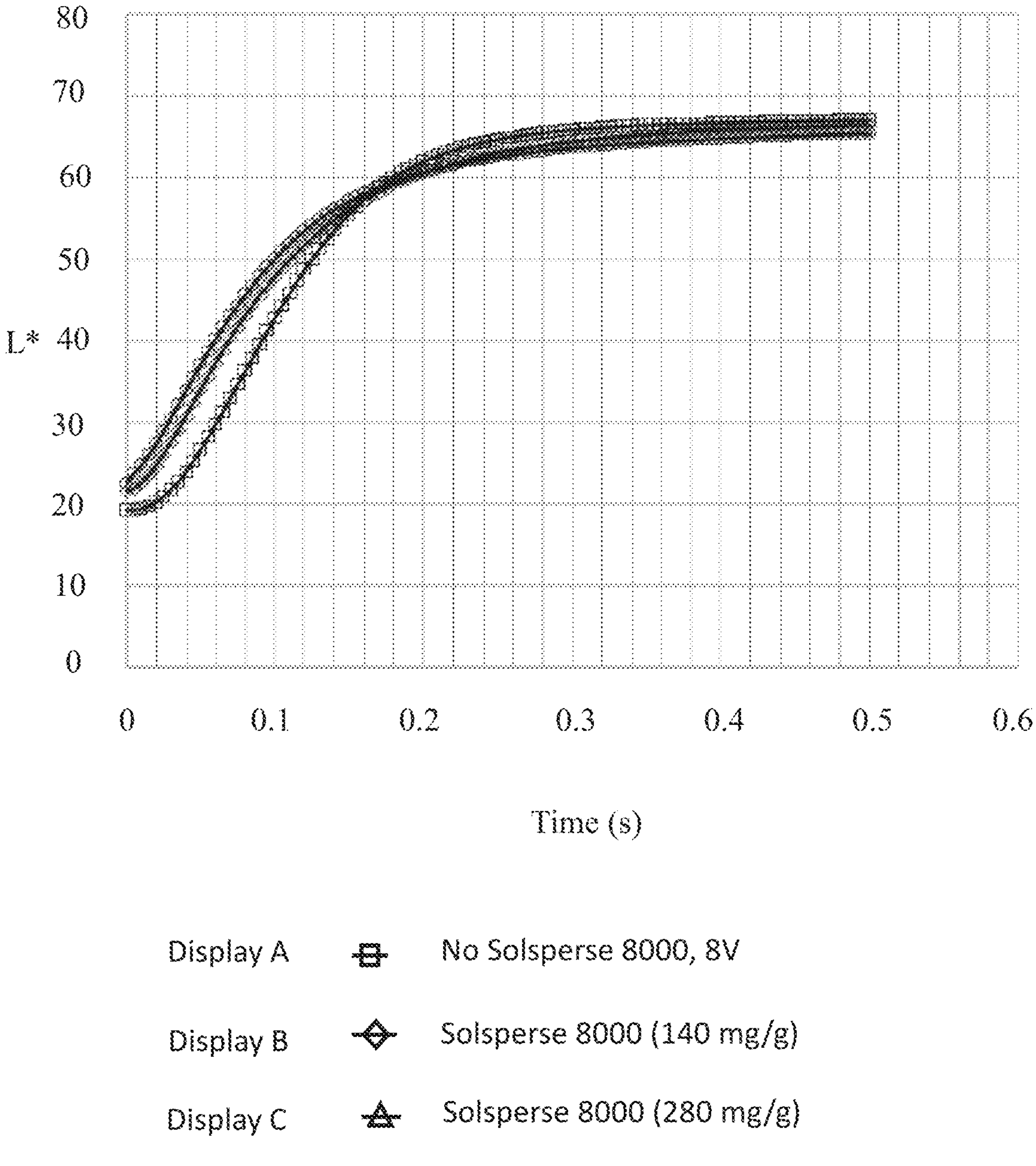
FIG. 9 shows graphs for determining the time required to switch from black state to white state for three electrophoretic compositions with different ratios of two charge control agents.

The consequence of being able to use more negative voltages to achieve the white state is that faster switching from black to white is possible. FIG. 9 shows the traces for switching from black to white for the three electrophoretic media A, B and C, at −8V, −10V and −13V, respectively. These are the most negative possible voltages that do not produce undue white state contamination by the yellow pigment.

Figure 11:
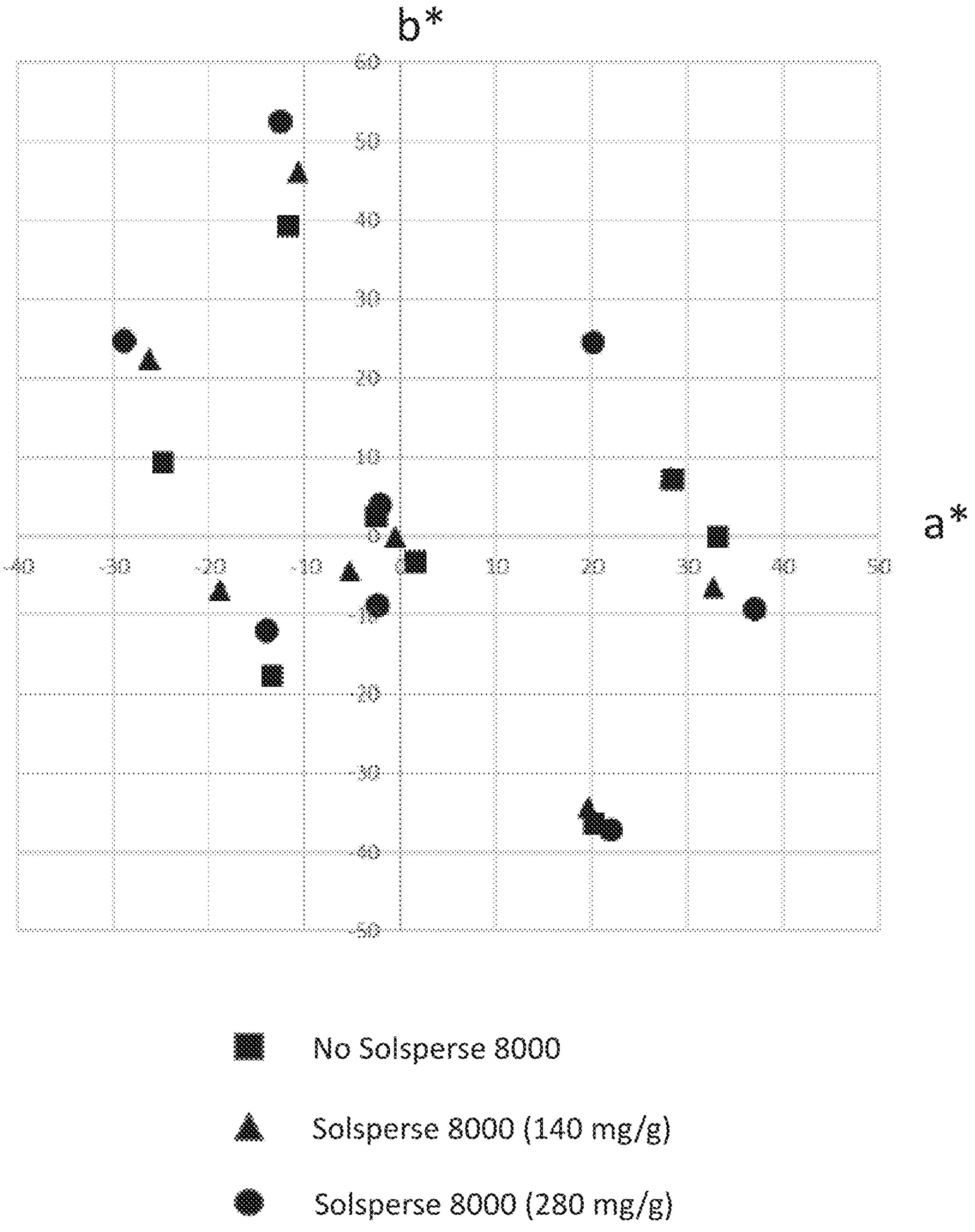
FIG. 11 shows graphs for determining the color gamut of electrophoretic displays comprising electrophoretic medium having white, yellow, cyan, and magenta particles, and two charge control agents at three different ratios.

The color gamuts of electrophoretic displays A, B, and C at 25° C. were determined using the color gamut measurement method provide below. The results are summarized in FIG. 11 and Table 4.

TABLE 4

Color gamut of electrophoretic displays from Example 4.

| | Color Gamut - 18 Frames ($DE^3$) | Color Gamut - 42 Frames ($DE^3$) |
|---|---|---|
| Display A | 28400 | 29200 |
| Display B | 31400 | 60040 |
| Display C | 38100 | 47300 |

The data of Table 4 show that displays using electrophoretic media B and C comprising Solsperse™ 8000 and a first charge control agent have higher color gamut than that of display using electrophoretic medium A that does not comprise Solsperse™ 8000.

Color Gamut Measurement Method.

Figure 10:
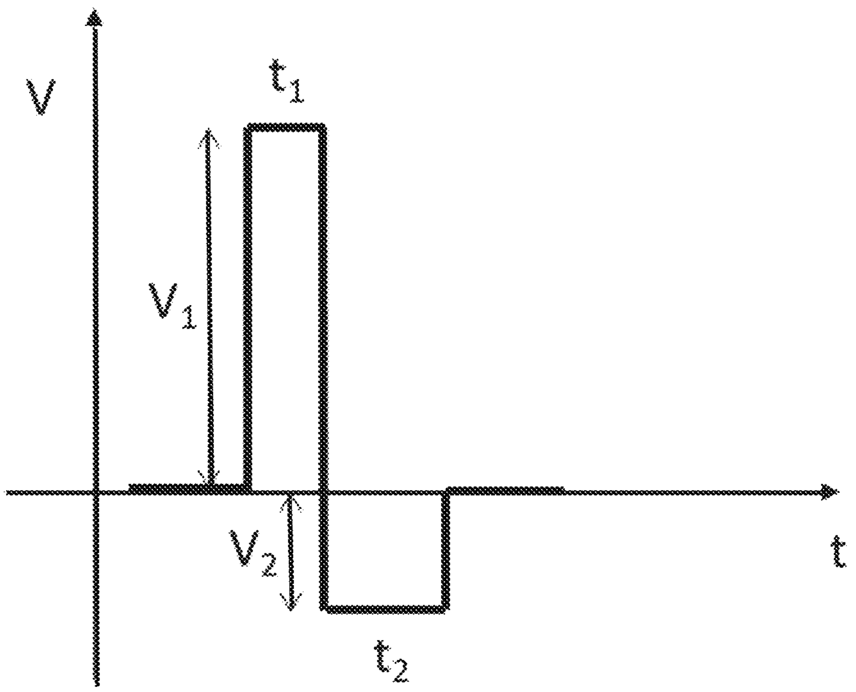
FIG. 10 illustrates test waveform used for the determination of the color gamut of inventive and control electro-optic devices.

Electrophoretic displays A, B, and C from Example 4, were electrically driven to generate eight optical states (white, yellow, red, magenta, blue, cyan, green, and black). The measurement was performed using a color computer in CIELab L*, a*, and b*). The electrophoretic devices were addressed using sequences of electrical pulses (such sequences being referred to as a "waveform"). In the following description, the voltages used in the waveform are those supplied to the second electrode layer (back electrodes) of the display, assuming that the first light-transmissive electrode at the front (viewing) surface of the display is a common electrode to all pixels and is connected to ground. Test waveforms comprise sequence of "dipoles" as shown in FIG. 10. Each dipole is composed of two monopoles, each being a pulse of length t and magnitude V. The two monopoles in each dipole are of opposite polarity. The voltages used in the test waveforms were +/−24V, +/−18V, +/−15V and +/−10V. Time was discretized into units of 11.74 ms, called "frames". Each frame would correspond to one scan of a thin-film transistor array backplane refreshed at a frequency of 85 Hz, although in the test described the backplane was segmented and directly driven. Two types of test waveform were used to assess the electro-optical performance of a device. The waveforms used in the first test had a length of 18 frames, while those used in the second test had a length of 42 frames. In each case, the waveform was populated with as many identical dipoles as would fit within the allowed number of frames. The color gamut of the display was measured by computing the volume of the convex hull containing every colored state produced by the set of testing waveforms. The color gamut is reported in $DE^3$ units. Broader color gamut, that is, larger space, means better electro-optic performance of the electrophoretic display.

Example 5: Preparation of Type II Electrophoretic Medium and the Corresponding Electrophoretic Displays Electrophoretic media of Type II were prepared that were similar to those prepared in Example 1, but with different yellow particles. The yellow particles and their preparation are described in Example 6 below. The yellow particles from Example 6 and the control yellow particles from Example 7 were used to prepare the various electrophoretic media (both inventive and control) with various contents of the second charge control agent (such as Solsperse™ 8000) and the first charge control agent (Formula IV).

Example 6: Preparation of Yellow Pigment for Type II Electrophoretic Medium of Example 5

Into a 1-liter plastic bottle were added 72.0 g of Pigment Yellow 155 (Ink Jet Yellow 4GC, supplied by Clariant Corporation), 28.8 g of an Isopar E solution of charge control agent represented by Formula IV (comprising 21.6 g charge control agent and 7.2 g Isopar E), and 349.2 of Isopar E. The dispersion was roll-milled for 16 hours using Zirconox beads (1.7-2.4 mm). An amount of 450 g of resulted dispersion was mixed in a reactor with 1.94 g of 2,2,2-trifluoroethyl methacrylate, 27.68 g of methyl methacrylate, 52.36 g of monomethacrylate terminated poly(dimethylsiloxane) (Gelest MCR-M22) and 65.38 g of Isopar E. The reactor was assembled with a nitrogen immersion tube, overhead stirring impeller and an air condenser. The overhead stirring was set to 250 rpm, the reaction mixture was purged with nitrogen for 60 minutes at 65° C., after which the immersion tube was removed, and the rotometer nitrogen level was set. In a small vial, 0.187 g of 2,2'-azobis(2-methylpropionitrile) (AIBN) was dissolved in 2.24 g ethyl acetate and added to a syringe. The resulted AIBN solution was injected into the reactor over 5-10 minutes and the reaction mixture was heated at 65° C. for 16 hours. The reaction mixture was dispensed into two 1-liter centrifuge bottles and centrifuged. The supernatant liquid was decanted and the remaining pigment was washed with Isopar E and centrifuged. The washing process was repeated two additional times. The remaining pigment was dried in a vacuum oven at 40° C. The dried pigment was dispersed into a 25 weight percent in Isopar E using sonication. The resulting dispersion was filtered through 200 μm mesh and used in the preparation of electrophoretic medium. The yellow particles comprises 31 weight percent of polymer by weight of the particle. The zeta potential of the yellow particle in the final dispersion was determined using Colloidal Dynamics AcoustoSizer II and ZetaProbe on sample and found to be +6 mV. That is the yellow particle has a weakly positive surface Example 7: The Process of Example 6 was Repeated, but without Including the Charge Control Agent. This is a Control Yellow Particle for Type II Media The color gamut of the various inventive and control electrophoretic displays from Example 5 were determined using the color gamut measurement method described above. The result of this evaluation are summarized in Table 5. For each display, the number at the top in the corresponding cell corresponds to the color gamut measure using waveforms with length of 18 frames. The number at the bottom in the corresponding cell corresponds to the color gamut measure using waveforms with length of 42 frames. The color gamut volumes of Type U electrophoretic media are somewhat smaller than those achieved by the Type I media.

TABLE 5

Color gamut of electrophoretic displays comprising Type II electrophoretic media.

| | | First Charge Control Agent % Content in Electrophoretic Medium | | | |
|---|---|---|---|---|---|
| | | 1.48 | 1.38 | 1.08 | 0.078 |
| Second Charge | 0 | 11000 | | | |
| Control Agent | | 21800 | | | |
| % Content in | 0.1 | | 15900 | 18000 | |
| Electrophoretic | | | 30400 | 33300 | |
| Medium | 0.2 | | 12200 | 17000 | |
| | | | 26700 | 33900 | |
| | 0.3 | | | | 16700 |
| | | | | | 32643 |

The same displays comprising Type II electrophoretic media were evaluated for the time required to switch from the white state to the black state. The determination was performed by applying a +16 V pulse and measure the time that is required to reach a delta L* of 30 between the first and final states. The time is measured and reported in Table 6 in milliseconds.

TABLE 6

Switching time required to switch Type II electrophoretic media form white state to black state in millisecond.

| | | First Charge Control Agent % Content in Electrophoretic Medium | | | |
|---|---|---|---|---|---|
| | | 1.48 | 1.38 | 1.08 | 0.078 |
| Second Charge Control | 0 | 23 | | | |
| Agent | 0.1 | | 26 | 32 | |
| % Content in | 0.2 | | 30 | 26 | |
| Electrophoretic Medium | 0.3 | | | | 26 |

The data show that all Type II electrophoretic media switch much faster than Type I media.

The data presented above show that inventive electrophoretic media compositions that comprise a combination of first and second charge control agents performed superior than non-inventive media in terms of color gamut and switching speed. This is true for both Type I and Type II electrophoretic media.

Example 8: Preparation of Charge Control Agent a (Hydrogenated Polyfarnesene with Two Terminal Sulfate Functional Groups and H+ as Counter Ion)

An amount of 9.8 g of hydrogenated hydroxyl terminated polyfarnesene (Krasol F3100, having number average molecular weight of 3100 g/mole; supplied by Cray Valley) was dissolved in 65 mL of ethyl ether. An amount of 0.66 mL of chlorosulfonic acid 6 mL) was added slowly into the solution under nitrogen gas at 0° C. and under constant stirring. The reaction was allowed to warm to room temperature with constant stirring for 18 hours. The ethyl ether layer was washed once with equal volume of water and then dried with sodium sulfate. The solvent was removed under reduced pressure and the material was purified by column chromatography (0-10% methanol/dichloromethane). This afforded the desired product in 76% yield.

Example 9: Preparation of Charge Control Agent B (Hydrogenated Polyfarnesene with Two Terminal Sulfate Functional Groups and Na+ as Counter Ion)

An amount of hydrogenated hydroxyl terminated polyfarnesene (Krasol F3100, having number average molecular weight of 3100 g/mole; supplied by Cray Valley) was dissolved in 62 mL of ethyl ether. An amount of 0.4 mL of chlorosulfonic acid 6 mL) was added slowly in the solution under nitrogen gas under constant stirring. The reaction was allowed to stir at room temperature for 48 hours. Then 0.75 g of NaOH dissolved in 50 mL of water was added to the reaction and stirred for an additional 1 hour. The organic layer was then separated from the aqueous layer and dried with sodium sulfate. The solvent removed under reduced pressure to afford the desired product in 91% yield.

Example 10: Preparation of Various Electrophoretic Displays Using Charge Control Agent A and Charge Control Agent B The charge control agents of Examples 8 and 9 are comb polymers having hydrogenated farnesyl groups and two terminal sulfate groups. Various Electrophoretic Displays comprising electrophoretic media of Type II as described above. The pigments of the electrophoretic media (White, Cyan, Magenta, and Yellow particles). The white particles are negatively charged, and the cyan, magenta and yellow are positively charged. The weight ratio of the particles are White:Cyan:Magenta:Yellow is 72:9:11:9. The total charge control agent content is 42 mg of the charge control agent per gram of pigment. If there are two charge control agents, the weight ratio of the cationic to noncationic Solsperser™ 8000 charge control agent is 1:8. The composition of the electrophoretic medium also includes a charge control agent or a combination of two charge control agents, as shown in Table 7, a hydrocarbon solvent, and polydimethylsiloxane fluid. The displays were exposed to a driving voltage sweep from −11 V to −16 V over 500 milliseconds at 25° C. that provides change in the color state of the display. The color of each display (L*, a*, and b*) were measured via a color computer at time of 0 s and every approximately 80 milliseconds during the voltage sweep. Inventive Examples 10B, 10C and 10D showed significantly faster color switch than Comparative Ex. 10A. The fastest switch was observed with the display of Ex. 10C, followed by the display of Ex. 10D, followed by the display of Ex. 10B. The display of Comparative Ex. 10A did not provide a stable color (a steady state) within the test interval of 500 milliseconds. The evaluation of the displays of the four Examples was repeated for voltage sweep from −18 V to −22 V over 500 milliseconds at 0° C. The results were analogous to those observed for the evaluation at 25° C.

TABLE 7

Examples of electrophoretic media comprising a charge control agent or a combination of charge control agents

| Type II Electrophoretic medium | Comp. Ex. 10A | Ex. 10B | Ex. 10C | Ex. 10D |
|---|---|---|---|---|
| Cationic Charge Control Agent from Ex. 8 | | | X | |
| Cationic Charge Control Agent from Ex. 9 | | | | X |
| Cationic Charge Control Agent from Example 1 of CCA111 of US2020/0355978 | X | X | X | X |
| Charge Control Agent Solsperse ™ 8000 | | X | | |

Example 11: Aqueous Sealing Compositions for Forming Sealing Layers

Evaluation of sealing Layer of Microcell Electrophoretic Displays. Microcells Various Microcells Electrophoretic Displays were prepared using Type II electrophoretic media. The microcell electrophoretic displays comprised of a first light-transmissive electrode layer, a microcell layer, and a second electrode layer. The microcell layer comprised a plurality of microcells, each microcell having an opening, and a sealing layer spanning the opening of the microcells. The sealing layer was formed by coating an aqueous composition as described in U.S. Patent Application Publication Nos. 2022/0251364A1 (application Ser. No. 17/590,705), 2022/0244612A1 (application Ser. No. 17/590,835), and U.S. patent application Ser. No. 18/055,072. In order to evaluate the effect of the sealing layer, two different aqueous sealing compositions were prepared and used to form the corresponding sealing layer (Ex. 11A and 11B of Table 7). Ex. 1 comprises a water-soluble ether, whereas Ex. 12 does not comprise a water-soluble ether.

TABLE 7

Aqueous sealing compositions that were used to form sealing layer of microcell electrophoretic displays.

| Ingredients | Ex. 11A | Ex. 11B |
|---|---|---|
| Poly(vinyl alcohol-co-ethylene) copolymer; [1] | 8.5 | 8.5 |
| Polyurethane; [2] | 2.7 | 2 7 |
| Carbon black; [3] | 5.9 | 5.9 |
| Polycarbodiimide Multifunctional polycarbodiimide; [4] | 0.16 | 0.16 |
| Hydrophobically modified alkali swellable acrylic emulsions; [5] | 0.17 | 0.17 |
| Siloxane Polyalkyleneoxide Copolymer; [6] | 0.09 | 0.09 |
| Dipropylene glycol dimethyl ether; | 1.8 | — |
| Ammonium Hydroxide to adjust pH to 6.5-8.5 | 0.07 | 0.07 |
| Deionized water | Q.S. | Q.S. |

[1] Poly(vinyl alcohol-co-ethylene) copolymer; ExcevalTM RS-1717, supplied by Kuraray;
[2] Polyurethane aqueous dispersion; L3838 aqueous dispersion, supplied by Hauthaway as a 35% dispersion in water;
[3] Carbon Black; Nerox ® 3500, supplied by Orion Engineered Carbon;
[4] Polycarbodiimide (Multifunctional polycarbodiimide - Water Solution); CARBODILITE ® V-02-L2, supplied by Nisshinbo Chemical as a 40% solution in water;
[5] Hydrophobically modified alkali swellable acrylic emulsion; Solthix ™ A-100, supplied by Lubrizol;
[6] Siloxane Polyalkyleneoxide Copolymer; Silwet ® L-7607 copolymer, supplied by Momentive.

Example 12: Preparation and Evaluation of Electrophoretic Displays Having Electrophoretic Medium with a Charge Control Agent or a Combination of Charge Control Agents A series of microcell electrophoretic displays were prepared and evaluated having different electrophoretic media of Type II. The microcell electrophoretic displays comprised of a first light-transmissive electrode layer, a microcell layer, and a second electrode layer. The microcell layer comprised a plurality of microcells, each microcell having an opening, and a sealing layer spanning the opening of the microcells. The sealing layer was formed by coating an aqueous composition of Ex. 11B, which did not comprise dipropylene glycol dimethyl ether, a water-soluble ether. The electrophoretic media comprised negatively charged white particles, and positively charged cyan, magenta, and yellow particles. The white particles were based on titanium dioxide pigment that were surface treated with a polymer formed by co-polymerization of methyl methacrylate monomer and 2,2,2-trifluoroethyl methacrylate. The cyan particles was based on copper phthalocyanine pigment (PB 15:3) that were surface treated with a polymer formed by methyl methacrylate and dimethylsiloxane monomer as described in Example 7 of U.S. Pat. No. 9,921,451. The magenta particles were based on dimethylquinacridone (PR 122) that were surface treated with a polymer that was formed by vinylbenzyl chloride and lauryl methyl acrylate as described in U.S. Pat. No. 9,697,778 and in Example 5 of U.S. Pat. No. 9,921,451. The yellow particles were based on Pigment Yellow 155 that were surface treated with a polymer formed by methyl methacrylate and dimethylsiloxane. All of the electrophoretic media also comprised a cationic charge control agent from Example 1 of CCA111 of US2020/0355978. The electrophoretic medium of two of the inventive examples (12B and 12E) comprised electrophoretic media also comprised another charge control agent (Solsperse™ 8000). The molecular structure of the second charge control agent includes two or more polar groups (amino groups) and a non-polar tail. All of the compositions and the evaluation data are provided in examples 12A to Ex. 12E of Table 8. The symbol X in the table means the presence of the corresponding ingredient in the composition.

The color gamut of the electrophoretic displays was measured by the Color Gamut Measurement Method described above. The C* (chroma) measurement of each color state of the Table was measured by a Color Computer. The zeta potential were measure by the method disclosed in Example 6.

TABLE 8

Compositions and evaluation data of electrophoretic displays having electrophoretic medium with a charge control agent or a combination of charge control agents.

| Ingredients | Comp Ex. 12A | Ex. 12B | Comp Ex. 12C |
|---|---|---|---|
| Sealing Layer | | | |
| From aqueous sealing composition of Ex. 11A | | | |
| From aqueous sealing composition of Ex. 11B | X | X | X |
| Electrophoretic medium | | | |
| Solsperse ™ 8,000 | | X | |
| Charge Control Agent from Example 1 of CCA111 of US2020/0355978 | X | X | X |
| Yellow 155 Polymer content weight % | 35.8 | 35.8 | 33.5 |
| Yellow Zeta potential (mV) | 7 | 7 | 21 |
| Color Gamut ($DE^3$) | 25040 | 27480 | 20450 |
| C* Yellow State | 14.9 | 14.6 | 9.2 |
| C* Green State | 12.3 | 10 | 7.2 |
| C* Dark State | 27.4 | 19.3 | 14.1 |

| Ingredients | Comp Ex. 12D | Comp Ex. E |
|---|---|---|
| Sealing Composition | | |
| From aqueous sealing composition of Ex. 11A | | |
| From aqueous sealing composition of Ex. 11B | X | X |

TABLE 8-continued

Compositions and evaluation data of electrophoretic displays having electrophoretic medium with a charge control agent or a combination of charge control agents.

| | | |
|---|---|---|
| Electrophoretic medium | | |
| Solsperse ™ 8,000 | | X |
| Charge Control Agent from Example 1 of CCA111 of US2020/0355978 | X | X |
| Yellow 155 Polymer content weight % | 32.7 | 32.7 |
| Yellow Zeta potential (mV) | 11 | 11 |
| Color Gamut ($DE^3$) | 20490 | 24170 |
| C* Yellow State | 12.4 | 13.2 |
| C* Green State | 10.2 | 10.4 |
| C* Dark State | 28.5 | 18.3 |

The data of Table 8 demonstrates that electrophoretic displays with electrophoretic medium comprising a combination of charge control agents (charge control agent from Example 1 CCA111 of US2020/0355978 and Solsperse™ 8000) showed improved electro-optic performance. Specifically, the color gamut of electrophoretic display electrophoretic medium comprising Solsperse™ 8000 in combination with a cationic charge control agent (and yellow particles with zeta potential of 7) is larger than electrophoretic display having electrophoretic medium with the same yellow particles and no Solsperse™ 8000 (Ex. 12B versus Comp. Ex. 12A). Analogously, the color gamut of the display of Ex. 12E is larger than that of Ex. 12D.

Example 13: Compositions and Evaluation Data of Electrophoretic Displays Having (a) Electrophoretic Medium with a Charge Control Agent or a Combination of Charge Control Agents and (b) a Sealing Layer Comprising a Water-Soluble Ether Another series of microcell electrophoretic displays were prepared and evaluated having different electrophoretic media of Type II. The structure of the displays was described in Example 12 above. Also, the nature of the electrophoretic particles were described in Example 12. All the aqueous sealing compositions of Example 13 (from Ex. 11A) that formed the sealing layer of the electrophoretic displays of Example 12 comprised water-soluble ether. All of the electrophoretic media also comprised a cationic charge control agent from Example 1 of CCA111 of US2020/0355978. Different yellow particles were prepared having various polymer contents and zeta potentials, as shown in Table 9. The symbol X in the table means the presence of the corresponding ingredient in the composition. The color gamut of the electrophoretic displays was measured by the Color Gamut Measurement Method described above. The C* (chroma) measurement of each color state of the Table was measured by a Color Computer. The zeta potential were measure by the method disclosed in Example 6.

TABLE 9

Compositions and evaluation data of electrophoretic displays having (a) an electrophoretic medium with a charge control agent or a combination of charge control agents, and (b) yellow particles with different polymer contents.

| Ingredients | Ex. 13A | Ex. 13B | Ex. 13C | Ex. 13D |
|---|---|---|---|---|
| Sealing Layer | | | | |
| From aqueous sealing composition of Ex. 11A | X | X | X | X |
| From aqueous sealing composition of Ex. 11B | | | | |
| Electrophoretic medium | | | | |
| Solsperse ™ 8,000 | | X | | X |
| Charge Control Agent from Example 1 CCA111 of US2020/0355978 | X | X | X | X |
| Yellow 155 Polymer content weight % | 35.8 | 35.8 | 33.5 | 33.5 |
| Yellow Particles Zeta potential (mV) | 7 | 7 | 21 | 21 |
| Color Gamut ($DE^3$) | 31110 | 46860 | 30180 | 40550 |
| C* Yellow State | 17.5 | 26.8 | 21.2 | 25.1 |
| C* Green State | 14.5 | 17.6 | 15.6 | 20 2 |
| C* Dark State | 16.1 | 10 | 9 | 8.2 |

| Ingredients | Ex. 13E | Ex. 13F | Ex. 13G | Ex. 13H |
|---|---|---|---|---|
| Sealing Layer | | | | |
| From aqueous sealing composition of Ex. 11A | X | X | X | X |
| From aqueous sealing composition of Ex. 11B | | | | |
| Electrophoretic medium | | | | |
| Solsperse ™ 8,000 | | X | X | X |
| Charge Control Agent from Example 1 of CCA111 of US2020/0355978 | X | X | X | X |
| Yellow 155 Polymer content weight % | 32.7 | 32.7 | 29.4 | 24.8 |
| Yellow Particles Zeta potential (mV) | 11 | 11 | 10 | 6 |
| Color Gamut ($DE^3$) | 43000 | 57840 | 59430 | 65880 |
| C* Yellow State | 27 | 33.3 | 33.3 | 39.8 |
| C* Green State | 19.2 | 26.1 | 29 | 29.7 |
| C* Dark State | 18 | 9.2 | 3.8 | 3.2 |

The data of Table 9 demonstrate that the inclusion of a water soluble ether in the sealing composition that forms the sealing layer significantly improves the electro-optic performance of the corresponding electrophoretic display (color gamut of: Ex. 13A versus Comp. Ex. 12A, Ex. 13B versus Ex. 12B, Ex. 13C versus Comparative Ex. 12C, Ex. 13E versus Comp. Ex. 12D, Ex. 13F versus Ex. 12E). Furthermore, the data of Table 9 demonstrate that improved electro-optic performance is observed in the displays where a combination of charge control agents is present in the electrophoretic medium with similar yellow particles (color gamut of Ex. 13B versus Ex. 13A, Ex. 13D versus Ex. 13C, Ex. 13F versus Ex. 13D, etc.). Finally, the data of Table 9 demonstrate that electrophoretic media having yellow particles with lower zeta potential show better performance (color gamut of Ex. 13H versus Ex. 13G). The improvement in color performance can be attributed to the better yellow and green states, as shown by the increased C* in these two states. Moreover, a more neutral dark state (black) also can be obtained, as indicated by the lower dark state C* of Comp. Ex. 13B compared to Comp. Ex. 13A (and also from the series of examples of Table 8). Thus, both (a) the combination of charge control agents (Cationic charge control agent from Example 1 CCA111 of US2020/0355978 and Solsperse™ 8000) and (b) the use of water soluble ether in the aqueous sealing composition of the electrophoretic display improve the yellow, green and dark states and the color gamut in general of the corresponding electrophoretic displays. This improvement is observed in all cases, independently of the yellow particles used (see Ex. 13D vs. Ex. 13C, Ex. 12E vs. Comp Ex. 12D; and Ex. 13F vs. Ex. 13E). However, the data of Table 1 show that the highest color gamut is achieved in the examples where the zeta potential of the yellow particles are in the range of 6-11 and the polymer content of the yellow particles is relatively low, as, for example, in Ex. 13F and Ex. 13H.

Thus, in general, electrophoretic displays having (a) electrophoretic media with a combination of charge control agents, (b) a water soluble ether in the aqueous sealing composition that forms the sealing layer, and (c) electrophoretic media with yellow particles having relatively low polymer content while maintaining low zeta potential (Ex. 13G and Ex. 13H), showed higher chroma (C*) of the yellow state, higher chroma (C*) of the green state, and lower C* of the dark state. The inventors of the present invention also observed that displays having features (a), (b), and (c) provided showed significantly faster switching speed from the dark state to the white state (when driven with a voltage sweep of from +24 V to −24 V) than displays that do not have these features. The most significant switching speed improvement was observed in displays having an electrophoretic medium with yellow particles with relatively low polymer content, for example, Ex. 13F, where the polymer content is 32.7 weight % by weight of the yellow particle.

Example 14: Compositions and Evaluation Data of Electrophoretic Displays Comprising (a) an Electrophoretic Medium with a Charge Control Agent or a Combination of Charge Control Agents and (b) a Water-Soluble Ether Another series of microcell electrophoretic displays were prepared and evaluated having different electrophoretic media of Type II. The structure of the displays was described in Example 12 above. Also, the nature of the electrophoretic particles were described in Example 12.

Two of the aqueous sealing compositions of Example 14 (from Ex. 11A) that formed the sealing layer of the electrophoretic displays of Example 14 comprised a water-soluble ether (Ex. 14D and Ex. 14E). The rest of aqueous sealing compositions of Example 14 (from Ex. 11B) that formed the sealing layer of the electrophoretic displays of Example 14 did not comprise a water-soluble ether (Comparative Ex. 14A, Ex. 14B, Ex. 14C, and Ex. 14F). All of the electrophoretic media also comprised a cationic charge control agent from Example 1 of CCA111 of US2020/0355978. Three of the electrophoretic media compositions of Example 14 (Ex. 14B, Ex. 14E, and Ex. 14F) also comprise a second charge control agent (Solsperse™ 8000). The molecular structure of the second charge control agent includes two or more polar groups (amino groups) and a non-polar tail. All yellow particles of the examples contain the same polymer content of 33.3 weight percent by weight of the particles. The symbol X in the table means the presence of the corresponding ingredient in the composition. The color gamut of the electrophoretic displays was measured by the Color Gamut Measurement Method described above. The C* (chroma) measurement of each color state of the Table was measured by a Color Computer. The compositions and evaluation data are provided in Table 10.

The combined data of Tables 8 and 9 showed that there is a synergistic effect on the elements of the presence of (a) Solsperse™ 8000 in the electrophoretic medium and (b) water soluble ether in the sealing layer, as can be concluded by comparing Ex. 12A, Ex. 12B, Ex. 13A, and Ex. 13B. That is, the effect of expanding the color gamut by including (a) Solsperser™ 8000 in the electrophoretic medium and (b) water soluble ether in sealing layer is larger than the added effects of each of elements (a) and (b) independently.

The combined data of Tables 8 and 9 also showed that there is a synergistic effect on the elements of (b) presence of water soluble ether in the sealing layer (c) lower polymer content on the yellow particles, as can be concluded by comparing Ex. 12A, Ex. 12C, Ex. 13A, and Ex. 13C. That is, the effect of expanding the color gamut by including (c) yellow particles having lower polymer content in the electrophoretic medium and (b) water soluble ether in sealing layer is larger than the added effects of each of elements (c) and (b) independently.

TABLE 10

Compositions and evaluation data of electrophoretic displays having (a) an electrophoretic medium with a charge control agent or a combination of charge control agents, and (b) a water-soluble ether.

| Ingredients | Comp Ex. 14A | Ex. 14B | Ex. 14C |
|---|---|---|---|
| Sealing Layer | | | |
| From aqueous sealing composition of Ex. 11A | | | |
| From aqueous sealing composition of Ex. 11B | X | X | X |
| Electrophoretic medium | | | |
| Solsperse ™ 8,000 | | X | |
| Charge Control Agent from Example 1 of CCA111 of US2020/0355978 | X | X | X |
| Dipropylene glycol dimethyl ether; [7] | | | X |
| Yellow 155 Polymer content weight % | 33.3 | 33.3 | 33.3 |
| Color Gamut ($DE^3$) | 22560 | 28610 | 25500 |
| C* Yellow State | 14.5 | 18.5 | 13.4 |
| C* Green State | 12.8 | 11.4 | 17.1 |
| C* Dark State | 28.2 | 15.7 | 26.4 |

| Ingredients | Ex. 14D | Ex. 14E | Ex. 14F |
|---|---|---|---|
| Sealing Layer | | | |
| From aqueous sealing composition of Ex. 11A | X | X | |
| From aqueous sealing composition of Ex. 11B | | | X |
| Electrophoretic medium | | | |
| Solsperse ™ 8,000 | | X | X |
| Charge Control Agent from Example 1 of CCA111 of US2020/0355978 | X | X | X |
| Dipropylene glycol dimethyl ether [7] | | | X |
| Yellow 155 Polymer content weight % | 33.3 | 33.3 | 33.3 |
| Color Gamut ($DE^3$) | 29870 | 38540 | 31830 |
| C* Yellow State | 18.4 | 21.2 | 18.3 |
| C* Green State | 13.6 | 17.2 | 16 |
| C* Dark State | 23.6 | 10.2 | 13.4 |

The inventors of the present invention surprisingly found that the effect of having a water soluble ether in the aqueous sealing composition that forms the sealing layer of the microcell electrophoretic display on the color performance of the display can be partially achieved by incorporating the water soluble ether in the electrophoretic medium. This is shown in the data of Table 10. The data of Ex. 14C showed that the presence of charge control agent from Example 1 of CCA111 of US2020/0355978 with dipropylene glycol dimethyl ether in the electrophoretic medium improved the electro-optic performance of the corresponding display, compared to the control Comp Ex. 14A. Further addition of a second charge control agent (Solsperse™ 8000) in the electrophoretic medium of Comp. Ex. 14C resulted in further improvement, as shown in Ex. 14F, although the effect was not as pronounced as having the water soluble ether in the aqueous sealing composition that formed the sealing layer (Ex. 14E).

Microcell electrophoretic displays were constructed with various electrophoretic medium (Type II). The displays comprised a first light-transmissive electrode layer, a microcell layer comprising a plurality of microcells, each microcell of the plurality of microcells having an opening, a sealing layer, the sealing layer spanning the openings of the plurality of microcells, and a second electrode layer (bottom electrode).

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

We claim:

1. An electrophoretic medium comprising:

a non-polar fluid;

a first type of particles comprising a first type of pigment, the first type of pigment being inorganic and having a first color, the first type of particles having a first charge polarity;

a second type of particles comprising a second type of pigment, the second type of pigment having a second color, the second color being different from the first color, the second type of particles having a second charge polarity, the second charge polarity being the opposite of the first charge polarity;

a third type of particles comprising a third type of pigment having a third color, the third color being different from the first and second colors, the third type of particles having the second charge polarity; and a fourth type of particles comprising a fourth type of pigment having a fourth color, the fourth color being different from the first, second, and third colors, the fourth type of particles having the first charge polarity or the second charge polarity;

a first charge control agent having a molecular structure, the molecular structure of the first charge control agent including at least one quaternary ammonium group and a non-polar tail;

a second charge control agent having a molecular structure, the molecular structure of the second charge control agent including two or more polar groups, and a non-polar tail, the two or more polar groups being selected from the group consisting of amino group, sulfonate group, sulfate group, sulfinate group, carboxylic acid group, phosphonic acid group, phosphinate group, phosphate group, hydroxyl group, thiol group, alpha diketone group, beta diketone group, ethylene oxide group, and propylene oxide group, the non-polar tail comprising a polymeric group, the polymeric group being formed by a monomer comprising an alkyl or alkenyl group having at least ten carbon atoms, and a water-soluble ether, the water-soluble ether having molecular weight from 75 to 5,000 Dalton.

2. The electrophoretic medium of claim 1, wherein the molecular structure of the monomer that is used to form the polymeric group of the non-polar tail of the second charge control agent includes a carboxylic acid, a carboxylic acid anhydride, or a carboxylic acid halide, wherein the carboxyl acid and the carboxylic acid halide comprises from 10 to 22 carbon atoms, and wherein the carboxylic acid anhydride comprises from 20 to 44 carbon atoms.

3. The electrophoretic medium of claim 2, wherein the molecular structure of the monomer that forms the polymeric tail of the second charge control agent further comprises a hydroxyl group or an amine group.

4. The electrophoretic medium of claim 1, wherein the monomer that is used to form the polymeric tail of the second charge control agent is selected from the group consisting of ricinoleic acid, linoleic acid, oleic acid, linoleic acid, acid halide of ricinoleic acid, acid halide of linoleic acid, acid halide of linolenic acid, ricinoleic acid anhydride, linoleic acid anhydride, oleic acid anhydride, and linolenic acid anhydride.

5. The electrophoretic medium of claim 1, wherein the molecular structure of the second charge control agent includes a comb polymer having alkyl or alkenyl branches and two terminal polar functional groups.

6. The electrophoretic medium of claim 1, wherein the first, second, third, and fourth type of particles have a layer of polymer, the polymer being complexed, adsorbed, or covalently bonded to the first, second, third, and fourth types of pigments.

7. The electrophoretic medium of claim 6, wherein the second and fourth types of particles comprise a polymer formed by methyl methacrylate and a monomer comprising dimethylsiloxane.

8. The electrophoretic medium of claim 6, wherein the third type of particles is formed by a treatment of pigment particles (a) with methyl methacrylate and a monomer comprising dimethylsiloxane or (b) with vinyl benzyl chloride and an acrylate or methacrylate monomer.

9. The electrophoretic medium of claim 1, wherein the polarities of the second, third, and fourth types of particles are all positive, wherein the second type of particles has a second zeta potential, wherein the third type of particles has a third zeta potential, wherein the fourth type of particles has a fourth zeta potential, and wherein the fourth zeta potential is smaller than the third zeta potential.

10. The electrophoretic medium of claim 1, wherein the first color is white, the second color is cyan, the third color is magenta, and the fourth color is yellow.

11. A color electrophoretic display comprising:

a first light-transmissive first electrode layer at a viewing surface;

a second electrode layer including an array of thin film transistors coupled to pixel electrodes; and an electro-optic material layer comprising the electrophoretic medium of claim 1, the electro-optic material layer being disposed between the first light-transmissive electrode layer and the second electrode layer.

* * * * *